US012443125B2

(12) United States Patent
Kusuda et al.

(10) Patent No.: US 12,443,125 B2
(45) **Date of Patent: *Oct. 14, 2025**

(54) DEVELOPING CARTRIDGE INCLUDING MOVABLE HOLDER FOR HOLDING ELECTRICAL CONTACT SURFACE

(71) Applicant: BROTHER KOGYO KABUSHIKI KAISHA, Nagoya (JP)

(72) Inventors: Shinya Kusuda, Nagoya (JP); Yasuo Fukamachi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,647

(22) Filed: Jun. 20, 2023

(65) Prior Publication Data

US 2023/0333498 A1 Oct. 19, 2023

Related U.S. Application Data

(63) Continuation of application No. 17/860,788, filed on Jul. 8, 2022, now Pat. No. 11,747,749, which is a (Continued)

(30) Foreign Application Priority Data

Apr. 1, 2020 (JP) ................................ 2020-065658

(51) Int. Cl.
*G03G 15/00* (2006.01)
*G03G 15/08* (2006.01)
*G03G 21/16* (2006.01)

(52) U.S. Cl.
CPC ..... *G03G 15/0863* (2013.01); *G03G 15/0889* (2013.01); *G03G 21/1652* (2013.01)

(58) Field of Classification Search
CPC .......... G03G 15/0863; G03G 15/0872; G03G 15/0889; G03G 21/1642; G03G 21/1647; G03G 21/1652
See application file for complete search history.

(56) References Cited

U.S. PATENT DOCUMENTS

2013/0183058 A1 7/2013 Won
2015/0139693 A1 5/2015 Shimizu et al.
(Continued)

FOREIGN PATENT DOCUMENTS

CN 205281112 U 6/2016
CN 106154789 A 11/2016
(Continued)

OTHER PUBLICATIONS

Office Action (Notice of Reasons for Refusal) issued in corresponding Japanese Patent Application No. 2020-065738, Nov. 21, 2023.
(Continued)

*Primary Examiner* — Hoang X Ngo
(74) *Attorney, Agent, or Firm* — Merchant & Gould P.C.

(57) ABSTRACT

A developing cartridge includes: a casing; a developing roller rotatable about an axis extending in a first direction; a first agitator; an agitator gear; a first protrusion; a developing memory; a first electrical contact surface; and a first holder holding the first electrical contact surface. The agitator gear includes a large diameter gear and a small diameter gear positioned between the large diameter gear and the casing in the first direction. The first protrusion protrudes outward from one end of the casing in the first direction, and is positioned between the casing and the large diameter gear in the first direction. The first protrusion is positioned away from the small diameter gear. The first holder is positioned farther from the first protrusion than the large diameter gear
(Continued)

is in the first direction. The first holder and the first electrical contact surface are movable relative to the casing.

20 Claims, 17 Drawing Sheets

Related U.S. Application Data continuation of application No. 17/218,238, filed on Mar. 31, 2021, now Pat. No. 11,442,377.

(56) References Cited

U.S. PATENT DOCUMENTS

| | | | | |
|---|---|---|---|---|
| 2017/0184998 | A1 | 6/2017 | Itabashi | |
| 2017/0185032 | A1* | 6/2017 | Itabashi | G03G 15/0863 |
| 2017/0269543 | A1 | 9/2017 | Itabashi | |
| 2017/0269544 | A1* | 9/2017 | Itabashi | G03G 21/1676 |
| 2017/0277117 | A1 | 9/2017 | Taguchi et al. | |
| 2018/0046131 | A1 | 2/2018 | Itabashi | |
| 2018/0095415 | A1 | 4/2018 | Nishiyama et al. | |
| 2018/0095416 | A1 | 4/2018 | Nishiyama et al. | |
| 2018/0203408 | A1 | 7/2018 | Itabashi et al. | |
| 2018/0284690 | A1 | 10/2018 | Mizutani | |
| 2018/0373195 | A1 | 12/2018 | Itabashi | |
| 2019/0171158 | A1 | 6/2019 | Shao et al. | |
| 2019/0265641 | A1 | 8/2019 | Yokoi | |
| 2021/0311410 | A1 | 10/2021 | Kusuda et al. | |

FOREIGN PATENT DOCUMENTS

| | | | |
|---|---|---|---|
| CN | 107239029 | A | 10/2017 |
| CN | 107728445 | A | 2/2018 |
| CN | 108663920 | A | 10/2018 |
| CN | 209895138 | U | 1/2020 |
| EP | 3 287 851 | A1 | 2/2018 |
| EP | 3 382 463 | A1 | 10/2018 |
| EP | 3 492 992 | A1 | 6/2019 |
| JP | 2008-242085 | A | 10/2008 |
| JP | 2015-99229 | A | 5/2015 |
| JP | 2016-142872 | A | 8/2016 |
| JP | 2017-67885 | A | 4/2017 |
| JP | 2017-116826 | A | 6/2017 |
| JP | 2017-181527 | A | 10/2017 |
| JP | 2018-25677 | A | 2/2018 |
| JP | 2018-60157 | A | 4/2018 |
| JP | 2018-116091 | A | 7/2018 |
| JP | 2019-8101 | A | 1/2019 |
| JP | 2019-144480 | A | 8/2019 |
| JP | 2019-174624 | A | 10/2019 |
| JP | 2021-162749 | A | 10/2021 |

OTHER PUBLICATIONS

International Search Report and Written Opinion issued in corresponding International Patent Application No. PCT/JP2021/013908, Jun. 8, 2021.

Extended European Search Report issued in corresponding European Patent Application No. 21166395.0, Jul. 16, 2021.

Office Action issued in corresponding Japanese Patent Application 2020-065658, Apr. 9, 2024.

Office Action issued in corresponding Japanese application 2020-065658, Nov. 21, 2023.

* cited by examiner

DEVELOPING CARTRIDGE INCLUDING MOVABLE HOLDER FOR HOLDING ELECTRICAL CONTACT SURFACE

CROSS REFERENCE TO RELATED APPLICATIONS

This application is a continuation of U.S. patent application Ser. No. 17/860,788, filed Jul. 8, 2022, now U.S. Pat. No. 11,7477,749, which is a continuation of U.S. patent application Ser. No. 17/218,238, filed Mar. 31, 2021, now U.S. Pat. No. 11,442,377, which claims priority from Japanese Patent Application No. 2020-065658 filed Apr. 1, 2020. The entire contents of the above-mentioned applications are incorporated herein by reference.

TECHNICAL FIELD

The present disclosure relates to a developing cartridge.

BACKGROUND

A prior art discloses a developing cartridge attachable to a drum cartridge. The developing cartridge includes: a casing configured to accommodate therein developing agent; a developing roller extending in a first direction; an agitator configured to agitate the developing agent; an agitator gear; a protrusion; and a developing memory. The agitator gear includes a large diameter gear and a small diameter gear. The large diameter gear is positioned farther away from one end of the casing in the first direction than the small diameter gear is from the one end. The protrusion is positioned between the one end of the casing and the large diameter gear in the first direction in order to make the developing cartridge compact in the first direction. The developing memory is electrically connected to an electrical contact surface movable together with the casing.

SUMMARY

Conceivably, in an attempt to restrain rubbing of the electrical contact surface relative to an electrical contact of an image forming apparatus at the time of attachment of the developing cartridge to the image forming apparatus, a holder holding the electrical contact surface and slidable relative to the casing may be further provided in the above-identified developing cartridge. However, in the above-identified developing cartridge, no consideration is made as to how the holder is arranged. In consideration of the arrangement of the holder in the developing cartridge, the holder needs to be positioned not to make contact with the agitator gear in a state where the holder is moved relative to the casing.

In view of the foregoing, it is an object of the present disclosure to provide a developing cartridge having a compact size in the first direction and including a holder positioned not to make contact with the agitator gear in a state where the holder is moved relative to the casing.

In order to attain the above and other object, according to one aspect, the present disclosure provides a developing cartridge including a casing, a developing roller, a first agitator, an agitator gear, a first protrusion, a developing memory, a first electrical contact surface, and a first holder. The casing is configured to accommodate therein developing agent. The developing roller is rotatable about a developing roller axis extending in a first direction. The developing roller is positioned at one end of the casing in a second direction crossing the first direction. The first agitator is rotatable about an agitator axis extending in the first direction. The agitator gear is positioned at one end in the first direction of the casing and is rotatable about the agitator axis together with the first agitator. The agitator gear includes: a large diameter gear; and a small diameter gear having a diameter smaller than a diameter of the large diameter gear. The small diameter gear is positioned between the large diameter gear and the casing in the first direction. The first protrusion protrudes outward in the first direction from the one end in the first direction of the casing. The first protrusion is positioned between the casing and the large diameter gear in the first direction. The first protrusion is positioned away from the small diameter gear in the second direction. The first protrusion is movable together with the casing. The first electrical contact surface is electrically connected to the developing memory. The first holder holds the first electrical contact surface and is positioned at the one end in the first direction of the casing. The first holder is positioned farther from the first protrusion than the large diameter gear is from the first protrusion in the first direction. The first holder and the first electrical contact surface are movable relative to the casing.

BRIEF DESCRIPTION OF THE DRAWINGS

The particular features and advantages of the embodiment (s) as well as other objects will become apparent from the following description taken in connection with the accompanying drawings, in which.

DETAILED DESCRIPTION

Figure 1:
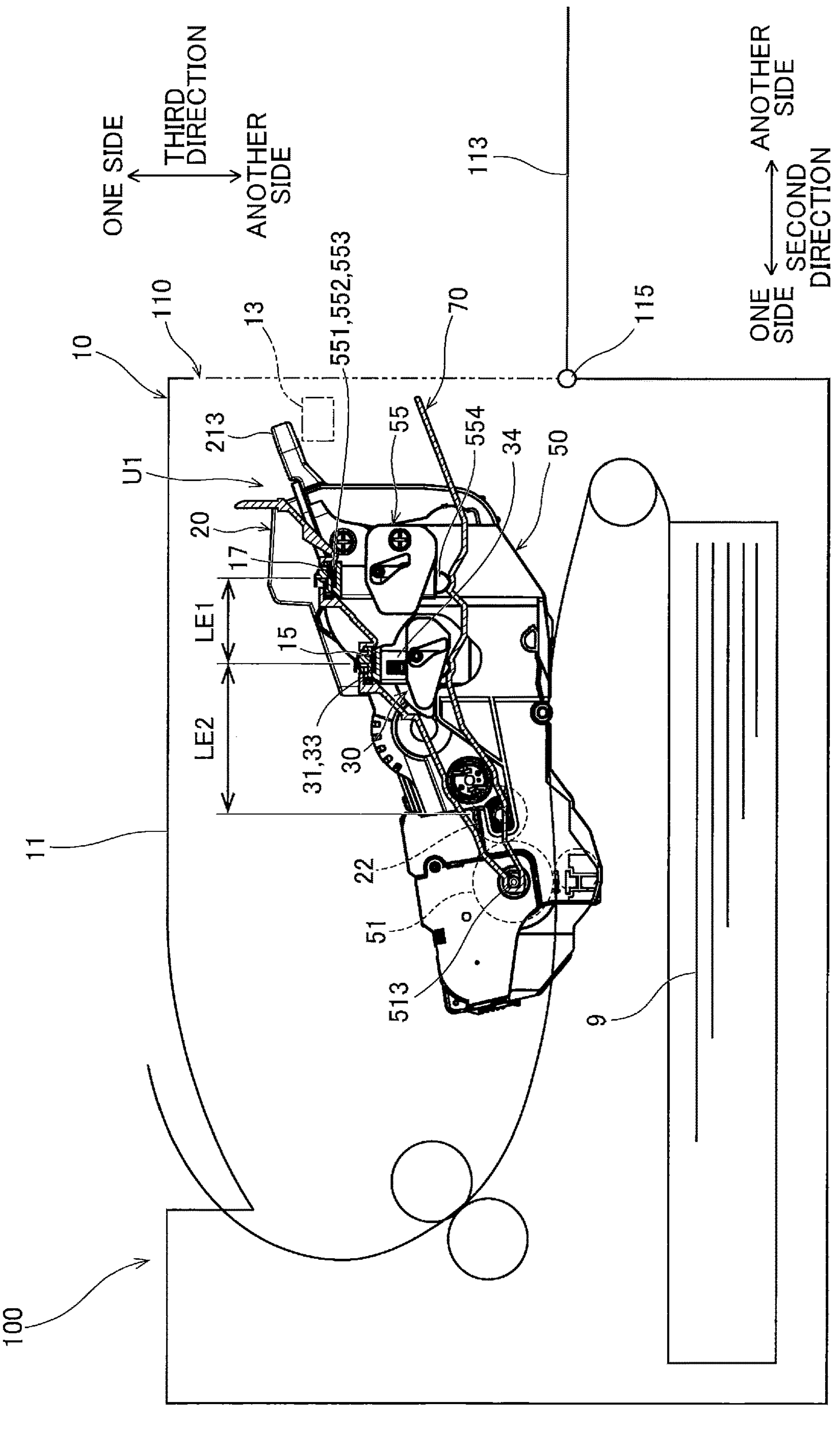
FIG. 1 is a diagram illustrating an overview of an image forming apparatus incorporating a developing cartridge according to one embodiment of the present disclosure.

Hereinafter, one embodiment of the present disclosure will be described while referring to the accompanying drawings. Note that the configuration and components described in the embodiment are merely exemplification, and the scope of the present disclosure is not limited to the embodiment. For the purpose of facilitating understanding, dimensions and the number of components in the drawings may be modified as needed.

<Image Forming Apparatus 100>

FIG. 1 is a diagram illustrating an overview an image forming apparatus 100 incorporating a developing cartridge 20 according to the embodiment. The image forming apparatus 100 is configured to form images on printing media 9 such as printing sheets. The image forming apparatus 100 includes a main body 10, the developing cartridge 20, and a drum cartridge 50. The developing cartridge 20 is attachable to the drum cartridge 50. In the following description, a unit constituted by the drum cartridge 50 and the developing cartridge 20 attached thereto will be referred to as a process unit U1. The process unit U1 is attachable to the main body 10. The main body 10 includes a main frame 11, and a main body substrate 13.

In the following description, a direction in which a rotation axis (developing roller axis A22) of a developing roller 22 in the developing cartridge 20 will be referred to as “first direction”, a direction in which the developing roller 22 and a first agitator 24 (see FIG. 3) are arranged will be referred to as “second direction”, and a direction crossing a first electrical contact surface 33 of the developing cartridge 20 will be referred to as “third direction”. The first direction, the second direction, and the third direction cross one another, and preferably, are orthogonal to one another.

<Main Frame 11>

As illustrated in FIG. 1, the main frame 11 has a box-like shape and has an opening 110. The opening 110 is positioned at another end in the second direction of the main frame 11. The main frame 11 includes a lid 113. The lid 113 is positioned at the other end portion in the second direction of the main frame 11. The main frame 11 also includes a hinge 115 at an end of the lid 113 at another end in the third direction of the lid 113. The lid 113 is movable about the hinge 115 between a closed position where the lid 113 closes the opening 110 and an open position where the lid 113 opens the opening 110. The process unit U1 is attachable to the main frame 11 in a state where the opening 110 is opened, i.e., the lid 113 is in the open position.

<Main Body Substrate 13>

As illustrated in FIG. 1, the main body substrate 13 is provided in the main frame 11. The main body substrate 13 includes a processor configured to perform a printing process, a body memory storing therein various information, and the like.

The main frame 11 also includes a guide frame 70. The guide frame 70 includes a main body electrical contact 15, and a main body electrical contact 17. The guide frame 70 will be described later in greater details.

<Main Body Electrical Contact 15 and Main Body Electrical Contact 17>

The main body electrical contact 17 is positioned closer to the opening 110 than the main body electrical contact 15 is to the opening 110 in the second direction. In other words, the main body electrical contact 15 is positioned farther away from the opening 110 than the main body electrical contact 17 is from the opening 110 in the second direction. The main body substrate 13 is electrically connected to both the main body electrical contact 15 and the main body electrical contact 17.

In a state where the process unit U1 is attached to the main frame 11, the main body electrical contact 15 is in contact with the first electrical contact surface 33 (described later) of the developing cartridge 20, and the main body electrical contact 17 is in contact with a second electrical contact surface 553 (described later) of the drum cartridge 50. The main body electrical contact 17 is electrically connectable to the second electrical contact surface 553 in a case where the main body electrical contact 15 is electrically connected to the first electrical contact surface 33.

In a state where the process unit U1 is attached to the main body 10, a developing substrate 32 (described later) of the developing cartridge 20 is electrically connected to the main body substrate 13 through the main body electrical contact 15; and a drum substrate 552 (described later) of the drum cartridge 50 is electrically connected to the main body substrate 13 through the main body electrical contact 17.

<Developing Cartridge 20>

Figure 2:
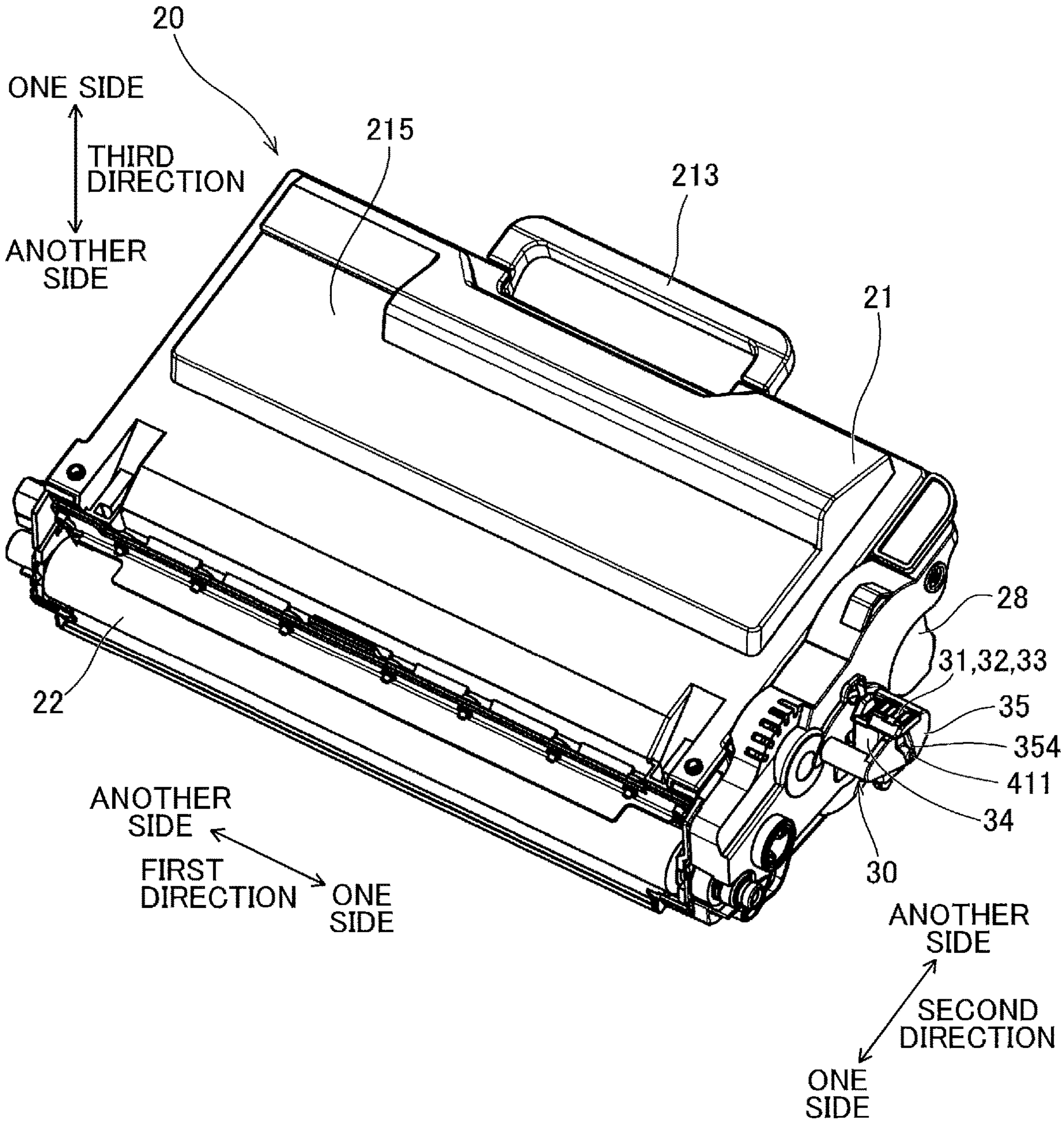
FIG. 2 is a perspective view of the developing cartridge according to the embodiment.
Figure 3:
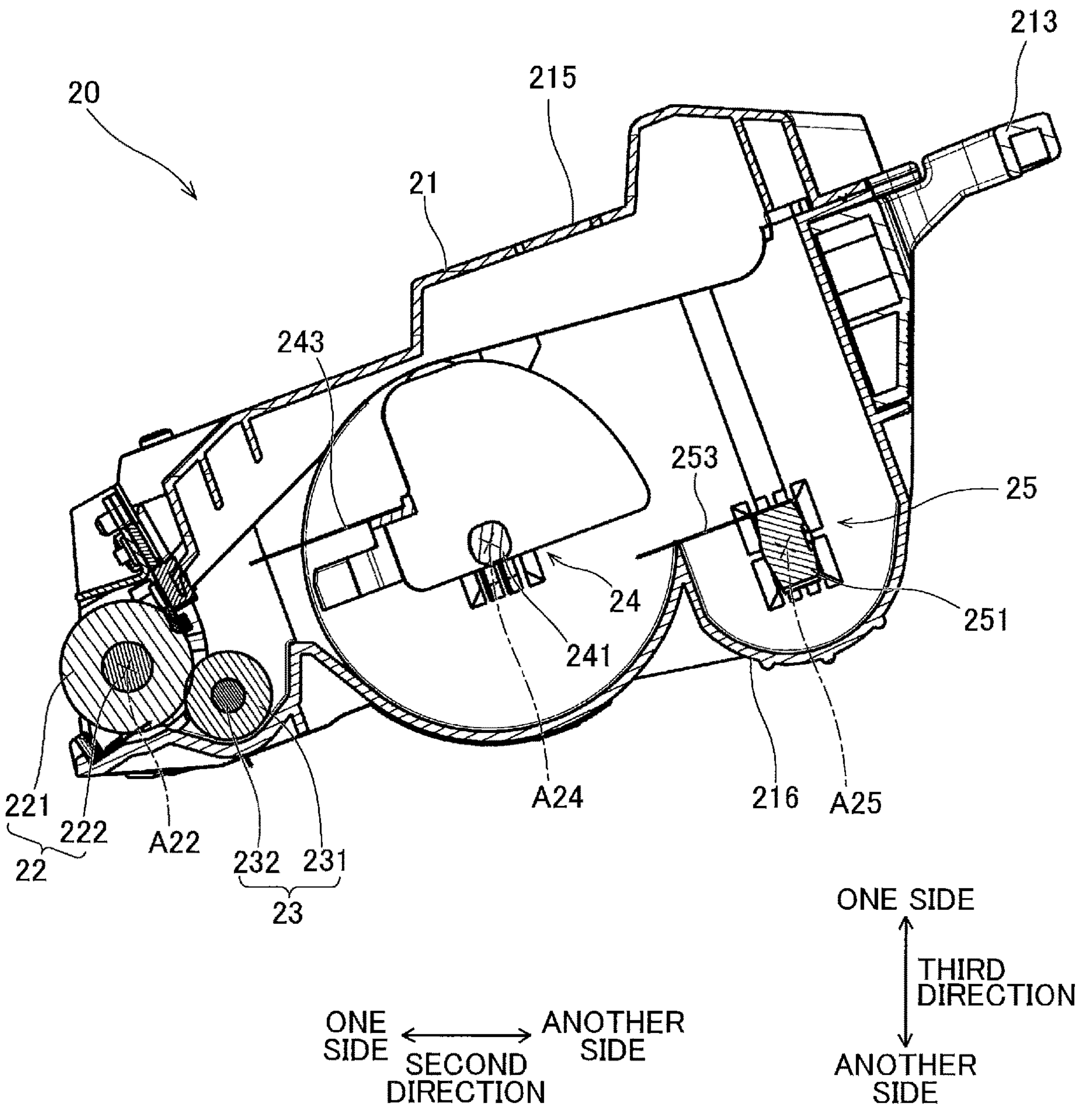
FIG. 3 is a cross-sectional view of a center portion of the developing cartridge according to the embodiment.
Figure 4:
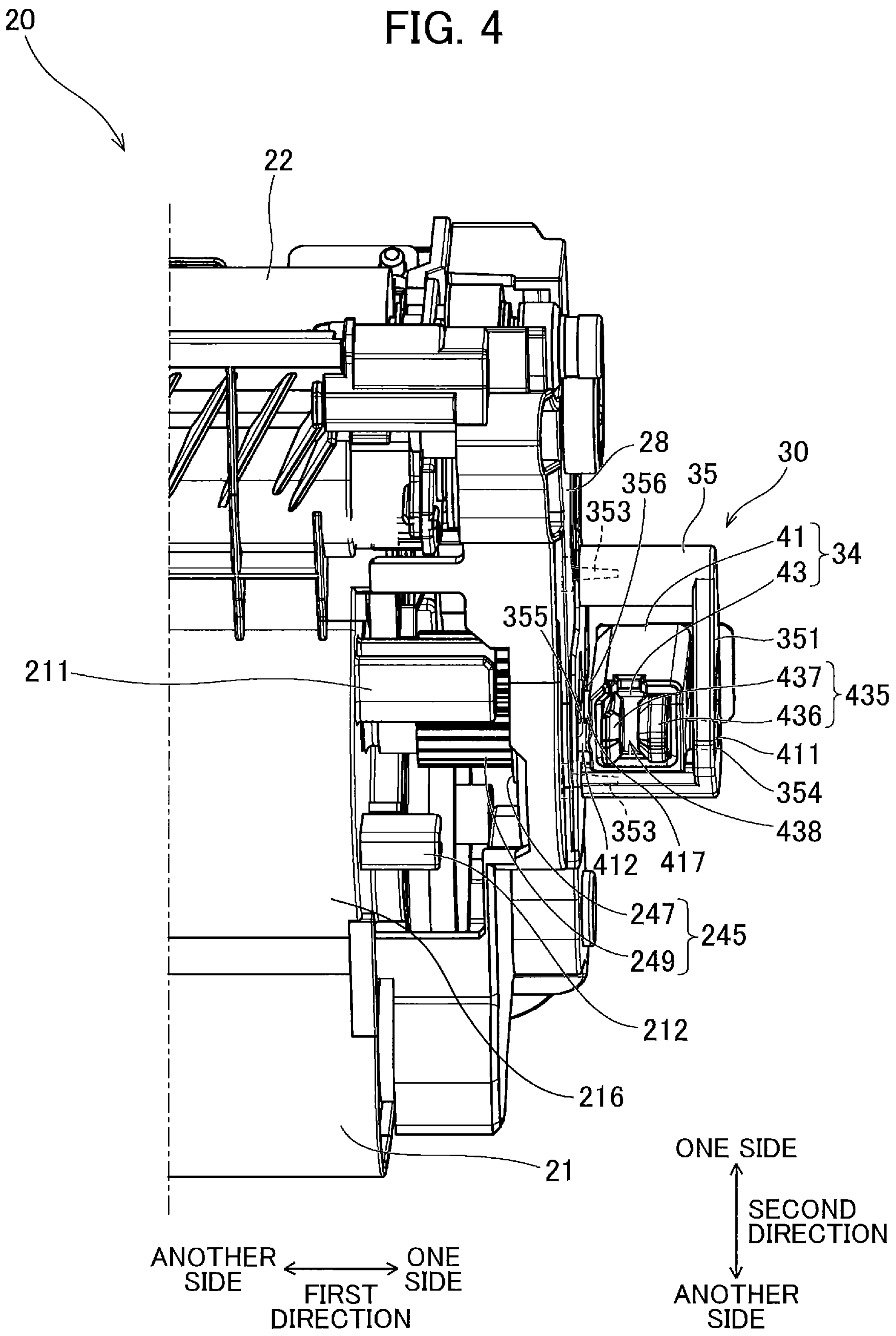
FIG. 4 is a bottom view illustrating one end portion in a first direction of the developing cartridge according to the embodiment.
Figure 5:
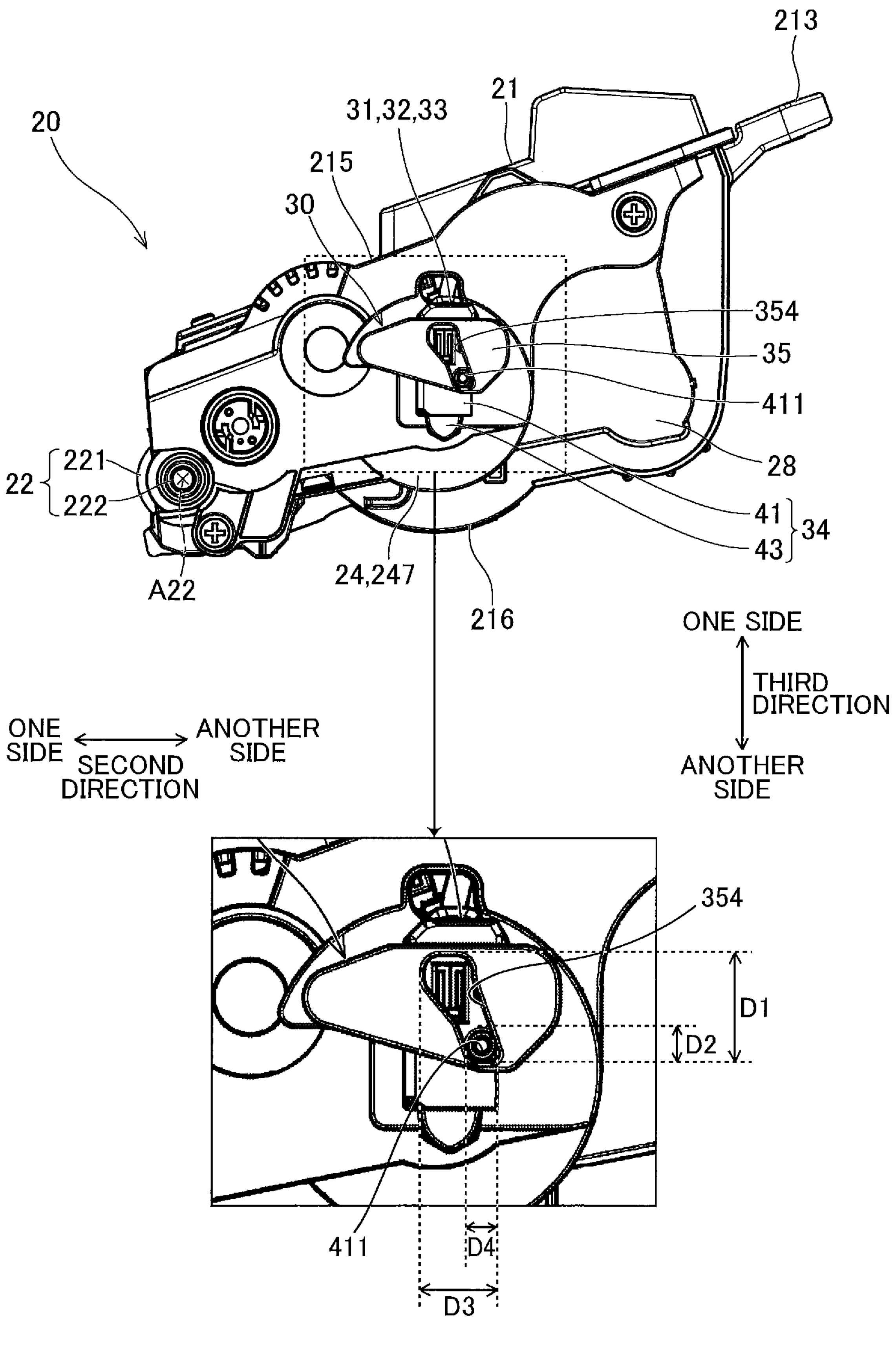
FIG. 5 is a side view of the developing cartridge in the image forming apparatus according to the embodiment.
Figure 6:
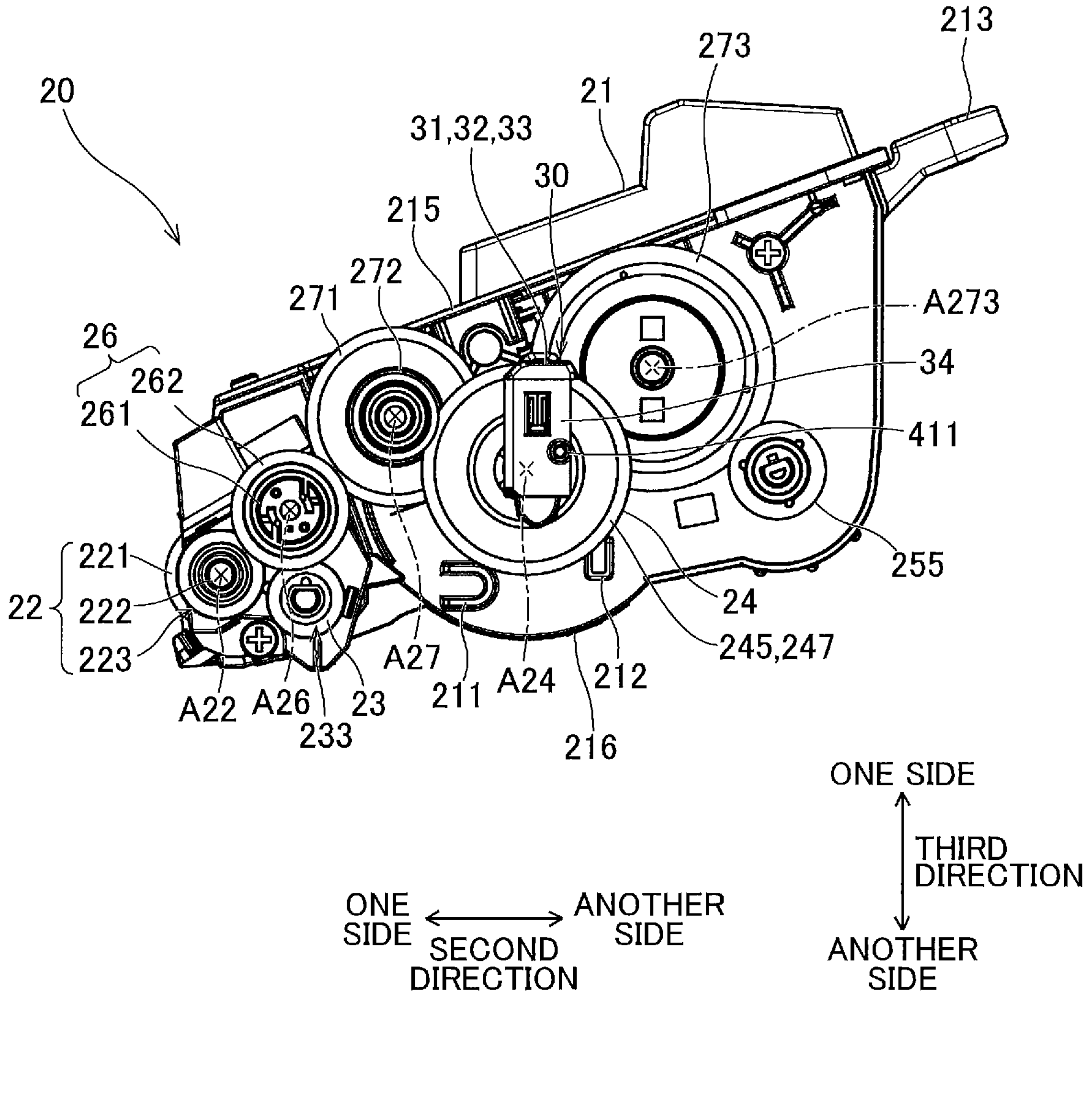
FIG. 6 is a side view of the developing cartridge according to the embodiment in which a gear cover is removed.
Figure 7:
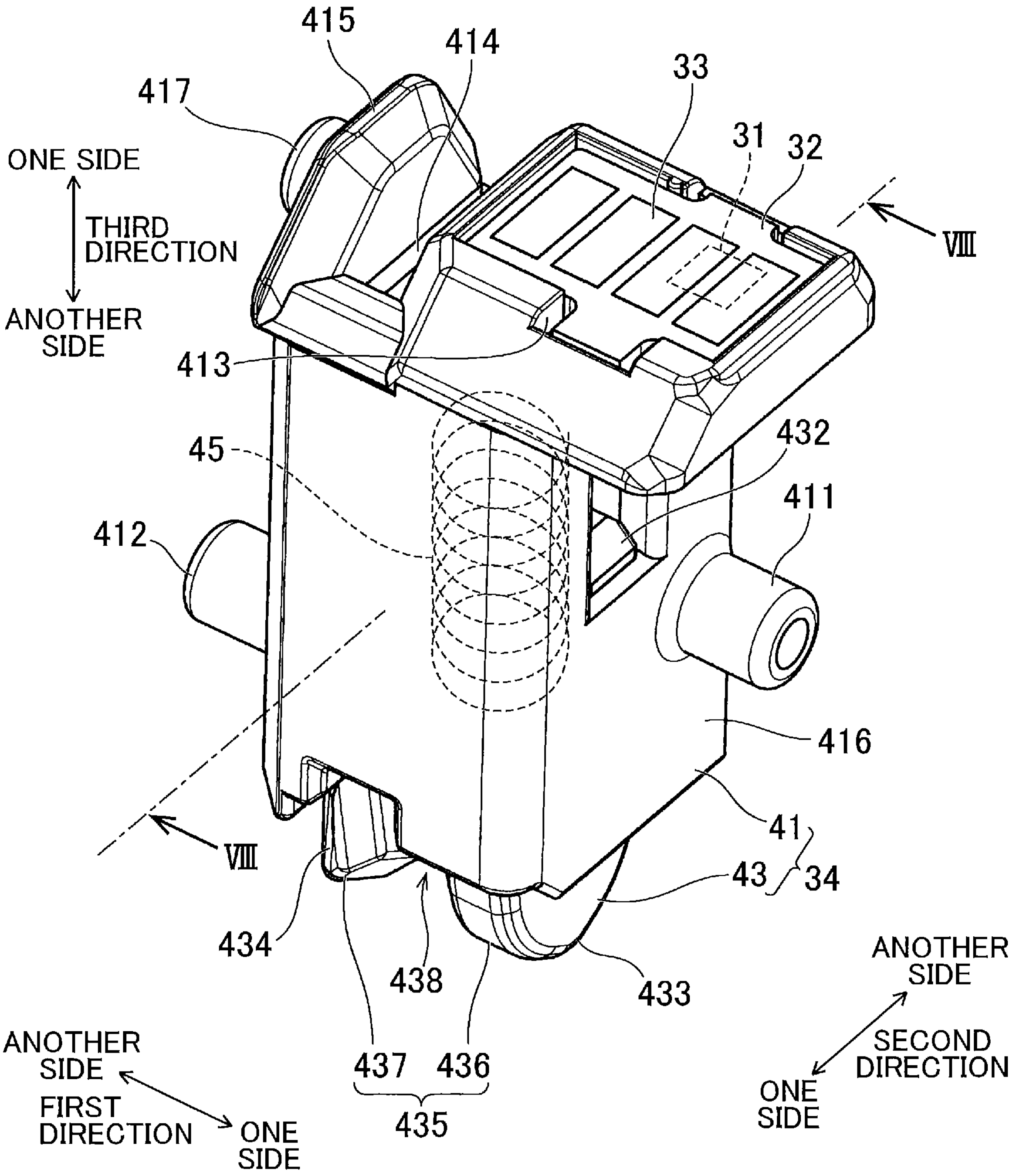
FIG. 7 is a perspective view of a first holder of the developing cartridge according to the embodiment.
Figure 8:
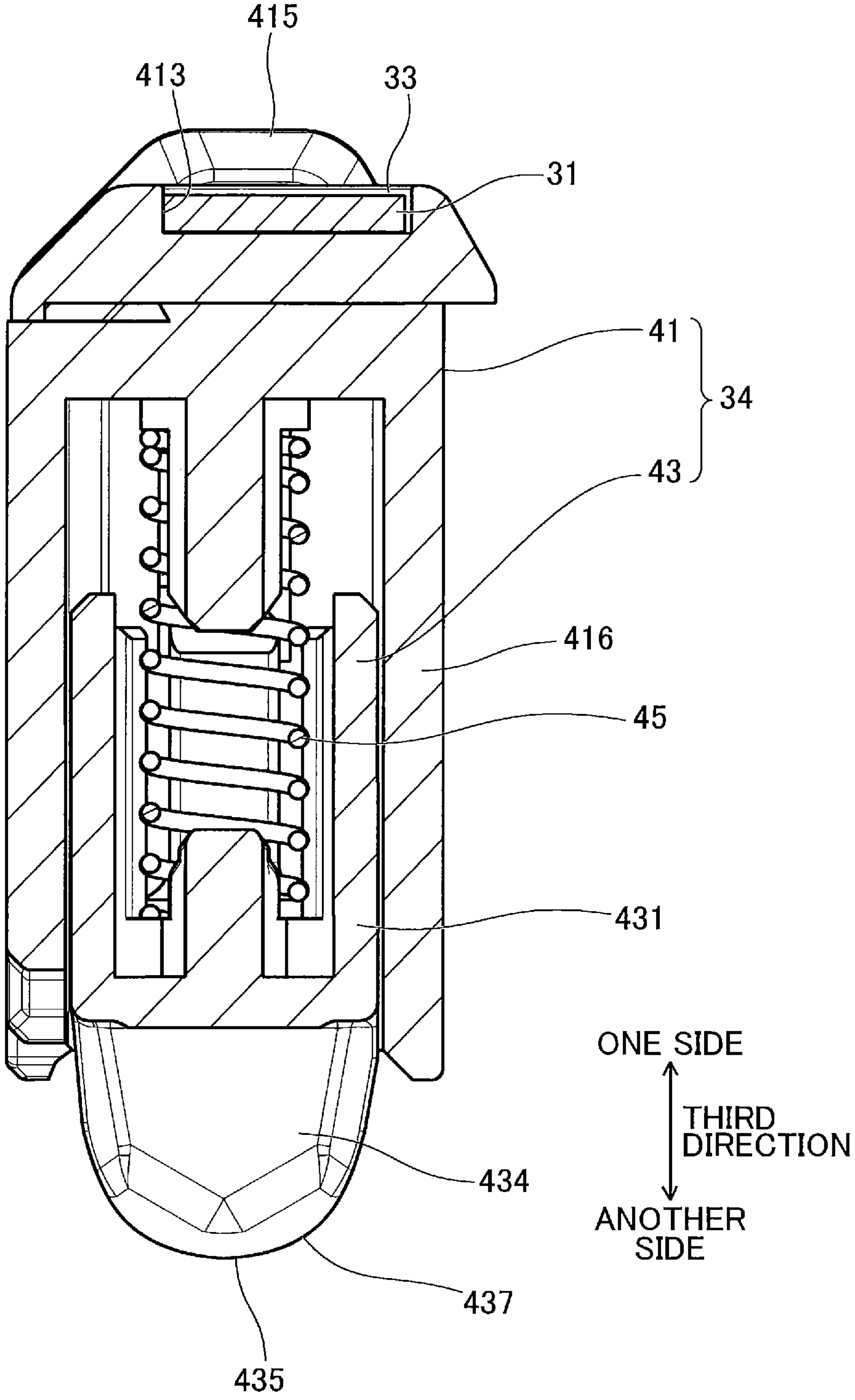
FIG. 8 is a cross-sectional view of the first holder taken along a line VIII-VIII in FIG. 7.

FIG. 2 is a perspective view of the developing cartridge 20. FIG. 3 is a cross-sectional view of a center portion of the developing cartridge 20. FIG. 4 is a bottom view illustrating one end portion in the first direction of the developing cartridge 20. FIG. 5 is a side view of the developing cartridge 20. FIG. 6 is a side view of the developing cartridge 20 in which a gear cover 28 is removed. FIG. 7 is a perspective view of a first holder 34 in the developing cartridge 20. FIG. 8 is a cross-sectional view of the first holder 34 taken along a line VIII-VIII in FIG. 7.

As illustrated in FIGS. 2 and 3, the developing cartridge 20 includes a casing 21, the developing roller 22, a supply roller 23, the first agitator 24, and a second agitator 25.

<Casing 21>

The casing 21 is configured to accommodate therein developing agent such as toner. The casing 21 extends in the first direction, and has a first outer surface 215 (see FIG. 2) and a second outer surface 216 (see FIGS. 1 and 4). The first outer surface 215 is positioned at one end in the third direction of the casing 21, whereas the second outer surface 216 is positioned at another end in the third direction of the casing 21. The developing cartridge 20 also includes a first handle 213 positioned at another end in the second direction of the casing 21.

<Developing Roller 22>

In a state where the developing cartridge 20 is attached to the main frame 11 (see FIG. 1), the developing roller 22 is rotatable about the developing roller axis A22 extending in the first direction (see FIGS. 5 and 6). The developing roller 22 is positioned at one end in the second direction of the casing 21. The developing roller 22 supplies the developing agent in the casing 21 to a surface of a photosensitive drum 51 (described later) of the drum cartridge 50 in the state where the developing cartridge 20 is attached to the main frame 11 (see FIG. 1) of the image forming apparatus 100.

As illustrated in FIG. 3, the developing roller 22 includes a developing roller body 221, and a developing roller shaft 222. The developing roller body 221 has a hollow cylindrical shape extending in the first direction. The developing roller body 221 is made of electrically conductive rubber.

The developing roller shaft 222 has a solid cylindrical shape extending along the developing roller axis A22. The developing roller shaft 222 is made of metal. The developing roller shaft 222 is positioned radially inward of the developing roller body 221, i.e., inside of the developing roller body 221. The developing roller shaft 222 penetrates the developing roller body 221 in the first direction. Note that the developing roller shaft 222 need not penetrate the developing roller body 221 in the first direction. Alternatively, two developing roller shafts 222 may be provided one at each end in the first direction of the developing roller body 221. The developing roller 22 is rotatable about the developing roller axis A22 of the developing roller shaft 222.

<Supply Roller 23>

The supply roller 23 is positioned inside the casing 21. The supply roller 23 is in contact with the developing roller 22 and is configured to supply the developing agent in the casing 21 to an outer peripheral surface of the developing roller 22. The supply roller 23 is rotatable about a supply roller axis extending in the first direction.

As illustrated in FIG. 3, the supply roller 23 includes a supply roller body 231, and a supply roller shaft 232. The supply roller body 231 has a hollow cylindrical shape extending in the first direction. The supply roller body 231 is made of electrically conductive sponge. The supply roller body 231 is in contact with the developing roller body 221.

<First Agitator 24>

The first agitator 24 is configured to agitate the developing agent in the casing 21. As illustrated in FIG. 3, the first agitator 24 is disposed within the casing 21. The first agitator 24 is rotatable about an agitator axis A24 extending in the first direction.

As illustrated in FIG. 3, the first agitator 24 includes an agitator shaft 241, and a blade 243. The agitator shaft 241 extends along the agitator axis A24. The blade 243 is coupled to the agitator shaft 241. The agitator shaft 241 and the blade 243 are rotatable about the agitator axis A24. Rotations of the blade 243 cause agitation of the developing agent in the casing 21. The blade 243 is made of resin or is in a form of a film, for example.

<Second Agitator 25>

The second agitator 25 is configured to agitate the developing agent in the casing 21. As illustrated in FIG. 3, the second agitator 25 is positioned in the casing 21. The second agitator 25 is positioned on the another side in the second direction of the first agitator 24. The second agitator 25 is rotatable about an agitator axis A25 extending in the first direction. The second agitator 25 includes an agitator shaft 251 and a blade 253. The agitator shaft 251 extends along the agitator axis A25. The blade 253 is coupled to the agitator shaft 251. The agitator shaft 251 and the blade 253 are rotatable about the agitator axis A25. Rotations of the blade 253 cause agitation of the developing agent in the casing 21. The blade 253 is made of resin or is in a form of a film, for example.

As illustrated in FIGS. 4 through 6, the developing cartridge 20 further includes a developing coupling 26, a developing roller gear 223, a supply roller gear 233, a first idle gear 271, a second idle gear 272, a third idle gear 273, a first agitator gear 245, a second agitator gear 255, the gear cover 28, and a developing memory unit 30.

As illustrated in FIG. 6, the developing coupling 26 is positioned at one end in the first direction of the casing 21. The developing coupling 26 is positioned between the developing roller 22 and the first agitator 24 in the second direction. The developing coupling 26 is rotatable about a coupling axis A26 extending in the first direction. The developing coupling 26 includes a coupling part 261, and a coupling gear 262. The coupling part 261 and the coupling gear 262 may be formed integrally with each other, or may be formed separately from each other. The coupling part 261 has a coupling hole recessed inward in the first direction.

The coupling part 261 is configured to receive a driving force from the image forming apparatus 100 in the state where the developing cartridge 20 is attached to the main frame 11 (see FIG. 1). The coupling part 261 is engageable with a main body coupling (not illustrated) of the image forming apparatus 100 to rotate about the coupling axis A26 together with the main body coupling. The coupling part 261 has a cylindrical shape extending in the first direction. The coupling gear 262 is positioned at the one end in the first direction of the casing 21, as illustrated in FIG. 6. The coupling gear 262 is rotatable together with the coupling part 261.

<Developing Roller Gear 223>

As illustrated in FIG. 6, the developing roller gear 223 is positioned at the one end in the first direction of the casing 21. The developing roller gear 223 is coupled to the developing roller shaft 222 and is rotatable together with the developing roller shaft 222. The developing roller gear 223 is in meshing engagement with the coupling gear 262.

<Supply Roller Gear 233>

As illustrated in FIG. 6, the supply roller gear 233 is positioned at the one end in the first direction of the casing 21. The supply roller gear 233 is coupled to the supply roller shaft 232 and is rotatable together with the supply roller shaft 232. The supply roller gear 233 is in meshing engagement with the coupling gear 262.

<First Idle Gear 271>

As illustrated in FIG. 6, the first idle gear 271 is positioned at the one end in the first direction of the casing 21. The first idle gear 271 is positioned between the second idle gear 272 and the casing 21 in the first direction. The first idle gear 271 is rotatable about an idle axis A27 extending in the first direction. The first idle gear 271 is in meshing engagement with the coupling gear 262.

<Second Idle Gear 272>

As illustrated in FIG. 6, the second idle gear 272 is positioned at the one end in the first direction of the casing 21. The second idle gear 272 is positioned farther from the casing 21 than the first idle gear 271 is from the casing 21 in the first direction. The second idle gear 272 is positioned opposite to the one end of the casing 21 with respect to the first idle gear 271 in the first direction. The second idle gear 272 has a diameter smaller than that of the first idle gear 271. The second idle gear 272 is rotatable about the idle axis A27 together with the first idle gear 271. The first idle gear 271 and the second idle gear 272 are rotatable integrally with each other. Incidentally, the first idle gear 271 and the second idle gear 272 may be formed integrally with each other, or may be formed separately from each other.

<Third Idle Gear 273>

As illustrated in FIG. 6, the third idle gear 273 is positioned at the one end in the first direction of the casing 21. The third idle gear 273 is positioned between a small-diameter gear 249 (described later) of the first agitator gear 245 and the second agitator gear 255 in the second direction. The third idle gear 273 is rotatable about an idle axis A273. The third idle gear 273 is in meshing engagement with the small-diameter gear 249 of the first agitator gear 245.

<First Agitator Gear 245>

As illustrated in FIG. 6, the first agitator gear 245 is positioned at the one end in the first direction of the casing 21. The first agitator gear 245 is coupled to the agitator shaft 241 of the first agitator 24. The first agitator gear 245 is rotatable about the agitator axis A24 together with the first agitator 24.

The first agitator gear 245 includes a large-diameter gear 247 and the small-diameter gear 249 (see FIG. 4). The small-diameter gear 249 has a diameter smaller than that of the large-diameter gear 247. As illustrated in FIG. 4, the small-diameter gear 249 is interposed between the large-diameter gear 247 and the casing 21 in the first direction. In other words, the large-diameter gear 247 is positioned opposite to the casing 21 with respect to the small-diameter gear 249 in the first direction.

<Second Agitator Gear 255>

As illustrated in FIG. 6, the second agitator gear 255 is positioned at the one end in the first direction of the casing 21. The second agitator gear 255 is coupled to the agitator shaft 251 of the second agitator 25. The second agitator gear 255 is rotatable about the agitator axis A25 together with the second agitator 25. The second agitator gear 255 is in meshing engagement with the third idle gear 273.

<Protrusion 211>

The casing 21 also includes a protrusion 211. As illustrated in FIGS. 4 and 6, the protrusion 211 is positioned at the one end in the first direction of the casing 21. The protrusion 211 protrudes outward in the first direction from the one end in the first direction of the casing 21. The protrusion 211 is positioned between the casing 21 and the large-diameter gear 247 in the first direction. The protrusion 211 is in separation from the small-diameter gear 249 of the first agitator gear 245. The protrusion 211 is positioned away from the small-diameter gear 249 in the second direction. The protrusion 211 is movable together with the casing 21. The protrusion 211 may be formed integrally with the casing 21, or may be formed separately from the casing 21. The protrusion 211 is positioned farther from the agitator axis A24 than the small-diameter gear 249 (see FIG. 4) is from the agitator axis A24. More specifically, the protrusion 211 is positioned farther from the agitator axis A24 than an outer peripheral surface of the small-diameter gear 249 is from the agitator axis A24. That is, the protrusion 211 is positioned radially outward of the small-diameter gear 249. The protrusion 211 is in separation from the first agitator gear 245.

The protrusion 211 is configured to receive an urging force directed from the other end to the one end of the casing 21 in the second direction. Accordingly, as the developing cartridge 20 is mounted on the drum cartridge 50, the protrusion 211 is urged toward the photosensitive drum 51 in the second direction by the drum cartridge 50 (see FIG. 9).

<Protrusion 212>

The casing 21 also includes a protrusion 212. As illustrated in FIGS. 4 and 6, the protrusion 212 protrudes outward in the first direction from the one end in the first direction of the casing 21. The protrusion 212 is positioned between the casing 21 and the large-diameter gear 247 in the first direction. The protrusion 212 is spaced apart from the small-diameter gear 249 in the second direction. The protrusion 212 is movable together with the casing 21. The protrusion 212 may be integral with the casing 21, or may be a separate member from the casing 21. The protrusion 212 is positioned farther from the agitator axis A24 than the small-diameter gear 249 (see FIG. 4) is from the agitator axis A24.

The protrusion 212 is provided to prevent an erroneous attachment of the developing cartridge 20 to a drum cartridge which is not compatible to the developing cartridge 20. That is, in a case where the developing cartridge 20 is attached to the drum cartridge 50 which is compatible to the developing cartridge 20, the protrusion 212 is fitted with a recessed portion (not illustrated) of the drum cartridge 50. On the other hand, in a case where the developing cartridge 20 is to be attached to a non-compatible drum cartridge, the protrusion 212 abuts a part of the drum cartridge, thereby preventing attachment of the developing cartridge 20 to the non-compatible drum cartridge.

<Gear Cover 28>

As illustrated in FIGS. 2 and 5, the gear cover 28 covers the coupling gear 262, the supply roller gear 233, the first idle gear 271, the second idle gear 272, the third idle gear 273, the first agitator gear 245, and the second agitator gear 255. Incidentally, the gear cover 28 need not cover the entire of each of the gears, but may cover a part of each of gears. The gear cover 28 is fixed to the one end in the first direction of the casing 21.

<Developing Memory Unit 30>

The developing memory unit 30 includes a developing memory 31, a developing substrate 32, the first electrical contact surface 33, the first holder 34, and a first holder cover 35. As illustrated in FIG. 4, the developing memory unit 30 is positioned at one end in the first direction of the gear cover 28.

<Developing Memory 31>

The developing memory 31 stores therein various information on the developing cartridge 20, such as ID information and lifetime information. The ID information is information used to identify the individual developing cartridge 20, and specifically, is a serial number. The lifetime information includes, for example, the cumulative number of revolutions of the developing roller 22, the cumulative number of printed sheets using the developing roller 22, and the cumulative number of dots.

The developing memory 31 is positioned at another end in the third direction of the developing substrate 32. The developing substrate 32 is positioned at one end in the third direction of the first holder 34. The developing substrate 32 is a plate-like member.

<First Electrical Contact Surface 33>

The first electrical contact surface 33 is positioned at one end in the third direction of the developing substrate 32. The first electrical contact surface 33 includes three thin plate-like electrodes. The first electrical contact surface 33 is electrically connected to the developing memory 31. As illustrated in FIG. 1, in the state where the developing cartridge 20 is attached to the main frame 11, the first electrical contact surface 33 is parallel to the second direction crossing the third direction. The first electrical contact surface 33 is movable in the first direction, the second direction and the third direction relative to the casing 21.

<First Holder 34>

As illustrated in FIG. 4, the first holder 34 is positioned at the one end in the first direction of the casing 21. The first holder 34 is positioned farther from the protrusions 211 and 212 than the large-diameter gear 247 is from the protrusions 211 and 222 in the first direction. The first holder 34 is positioned farther from the large-diameter gear 247 than the gear cover 28 is from the large-diameter gear 247 in the first direction. The first holder 34 is positioned farther from the casing 21 than the first agitator gear 245 is from the casing 21 in the first direction.

As illustrated in FIG. 2, the first holder 34 is positioned between the developing roller 22 and the first handle 213 in the second direction. As illustrated in FIG. 6, the first holder 34 has at least a portion disposed within an area obtained by light projection to the large-diameter gear 247 in the first direction. As illustrated in FIGS. 5 and 6, the first holder 34 is positioned between the first outer surface 215 and the second outer surface 216 of the casing 21 in the third direction.

The first holder 34 holds the developing substrate 32 to hold the first electrical contact surface 33. Specifically, as illustrated in FIG. 7, the first holder 34 has a first outer surface 413 that constitutes one end in the third direction of the first holder 34. The first outer surface 413 has a recessed shape to allow the developing substrate 32 to be placed therein. The developing substrate 32 is fixed to the first outer surface 413 by, for example, an adhesive agent. In this way, the first outer surface 413 can hold the developing substrate 32. That is, the first outer surface 413 can hold the developing memory 31 and the first electrical contact surface 33 by way of holding the developing substrate 32.

<First Holder Cover 35>

The first holder cover 35 is positioned at one end in the first direction of the gear cover 28. The first holder cover 35 is positioned farther from the one end in the first direction of the casing 21 than the first agitator gear 245 is from the one end in the first direction of the casing, as illustrated in FIG. 4. The first holder cover 35 has a generally hollow rectangular columnar shape and surrounds the first holder 34 in cooperation with the gear cover 28. Specifically, the first holder cover 35 is a generally U-shaped member to cover one end portion in the first direction of the first holder 34, one end portion in the second direction of the first holder 34, and another end portion in the second direction of the first holder 34. The first holder cover 35 holds the first holder 34. The first holder 34 is movable in the first direction, the second direction, and the third direction relative to the first holder cover 35.

As illustrated in FIG. 4, the first holder cover 35 includes a first plate portion 351. The first plate portion 351 is positioned to be spaced apart from the gear cover 28 toward the one side in the first direction. The first holder 34 is positioned between the first plate portion 351 and the gear cover 28 in the first direction.

As illustrated in FIG. 4, the first holder cover 35 is fixed to the gear cover 28 by two screws 353 inserted through an inner surface of the gear cover 285. The two screws 353 are positioned away from each other in the second direction to fix the first holder cover 35 to the gear cover 28. Incidentally, the number of screws 353 is arbitrary, i.e., a single screw 353 or not less than three screws 353 may be employed to fix the first holder cover 35 to the gear cover 28.

As illustrated in FIGS. 4 and 5, the first holder cover 35 has a through-hole 354 formed in the first plate portion 351. The through-hole 354 penetrates the first plate portion 351 in the first direction, and extends diagonally toward the one side in the third direction as extending toward the one side in the second direction. The gear cover 28 has through-holes 355 and 356 as illustrated in FIG. 4. Each of the through-holes 355 and 356 may have a shape identical to or different from that of the through-hole 354.

The first holder 34 is movable relative to the casing 21. The first electrical contact surface 33 held by the first holder 34 is also movable relative to the casing 21. The first holder 34 is movable also relative to the gear cover 28.

As illustrated in FIGS. 4 and 7, the first holder 34 includes a first boss 411, a second boss 412, and a third boss 417 those extending in the first direction. As illustrated in FIG. 7, the first boss 411 is positioned at one end in the first direction of the first holder 34. Each of the second boss 412 and the third boss 417 are positioned at another end in the first direction of the first holder 34. The third boss 417 is positioned to be spaced apart from the second boss 412 toward the one side in the third direction. The first boss 411 is positioned between the second boss 412 and the third boss 417 in the third direction.

The first boss 411 is loosely inserted through the through-hole 354, the second boss 412 is loosely inserted through the through-hole 355, and the third boss 417 is loosely inserted through the through-hole 356. As illustrated in FIG. 5, the through-hole 354 has a dimension D1 in the third direction greater than a dimension D2 of the first boss 411. The first boss 411 moves inside the through-hole 354 in the third direction as the first holder 34 moves in the third direction relative to the first holder cover 35. Further, the through-hole 355 has a dimension in the third direction greater than that of the second boss 412. The second boss 412 moves inside the through-hole 355 in the third direction as the first holder 34 moves in the third direction relative to the first holder cover 35.

As illustrated in FIG. 5, the through-hole 354 also extends in the second direction. The through-hole 354 has a dimension D3 in the second direction greater than a dimension D4 of the first boss 411. The first boss 411 moves inside the through-hole 354 in the second direction when the first holder 34 moves in the second direction relative to the first holder cover 35. Hence, the first holder 34 is movable in the second direction relative to the casing 21.

Note that, in place of the through-hole 354, a recessed portion may be employed to receive therein an end portion of the first boss 411. In the same manner, a recessed portion for receiving an end portion of the second boss 412 may be employed in place of the through-hole 355; and a recessed portion for receiving an end portion of the third boss 417 may be employed in place of the through-hole 356.

Further, the first holder cover 35 may include a second plate portion disposed between the first holder 34 and the gear cover 28 in the first direction, and the second boss 412 and the third boss 417 may be inserted in two through-holes formed in the second plate-like section, respectively. In this case, the two through-holes in the second plate portion may respectively overlap the through-holes 355 and 356 of the gear cover 28 in the first direction. Since the first holder cover 35 of the present embodiment does not include the second plate portion, the first holder cover 35 can be made compact than otherwise.

<Holder Groove 414>

As illustrated in FIG. 7, the first holder 34 further has a holder groove 414. The holder groove 414 is formed at the one end in the third direction of the first holder 34. The holder groove 414 is positioned between the protrusion 211 and the first outer surface 413 in the first direction, and between the protrusion 212 and the first outer surface 413 in the first direction.

As illustrated in FIG. 7, the first holder 34 also includes a holder protrusion 415 positioned away from the first outer surface 413 in the first direction. The holder groove 414 is positioned between the first outer surface 413 and the holder protrusion 415 in the first direction.

Specifically, as illustrated in FIGS. 7 and 8, the first holder 34 includes a first member 41 and a second member 43. The second member 43 is positioned at the another side of the first member 41 in the third direction. The first outer surface 413 constitutes one end in the third direction of the first member 41. The first member 41 also has a sleeve portion 416 at another end portion in the third direction of the first member 41. The sleeve portion 416 has a hollow prismatic columnar shape extending in the third direction.

As illustrated in FIGS. 7 and 8, the second member 43 includes a main body portion 431, a pawl portion 432, a protruding portion 433, and a protruding portion 434. As illustrated in FIG. 8, the main body portion 431 has a hollow prismatic columnar shape extending in the third direction, and has a closed bottom end at another end portion in the third direction of the main body portion 431. The main body portion 431 is inserted in the sleeve portion 416. The second member 43 is movable in the third direction relative to the first member 41. As illustrated in FIG. 7, the pawl portion 432 has a tip end portion inserted in a through-hole of the sleeve portion 416 of the first member 41. Engagement of the pawl portion 432 with the through-hole serves to prevent the second member 43 from coming off the first member 41.

Each of the protruding portions 433 and 434 protrudes from the other end in the third direction of the main body portion 431 toward the another side in the third direction. The protruding portion 434 is positioned away from the protruding portion 433 toward the another side in the first direction. In other words, the protruding portion 434 is positioned closer in the first direction to the one end in the first direction of the casing 21 than the protruding portion 433 is to the one end in the first direction of the casing 21. The protruding portion 434 is positioned closer to the gear cover 28 than the protruding portion 433 is to the gear cover 28 in the first direction.

The protruding portion 433 has a curved surface 436, and the protruding portion 434 has a curved surface 437. The curved surface 437 is positioned away from the curved surface 436 toward the another side in the first direction. In other words, the curved surface 437 is positioned closer to the one end of the casing 21 than the curved surface 436 is to the one end of the casing 21 in the first direction. The curved surface 437 is positioned closer to the gear cover 28 than the curved surface 436 is to the gear cover 28 in the first direction.

The curved surface 436 and the curved surface 437 constitute a second outer surface 435 positioned at the other end in the third direction of the first holder 34. That is, the second outer surface 435 constitutes another end in the third direction of the second member 43. The second outer surface 435 has a holder groove 438. The holder groove 438 is provided between the curved surface 436 and the curved surface 437 in the first direction.

<Resilient Member 45>

As illustrated in FIGS. 7 and 8, the first holder 34 further includes a resilient member 45. The resilient member 45 is a coil spring positioned between the first outer surface 413 and the second outer surface 435 in the third direction. Specifically, as illustrated in FIG. 8, the resilient member 45 is positioned inside the sleeve portion 416 of the first member 41 and inside the main body portion 431 of the second member 43. The resilient member 45 has one end in the third direction in contact with the first member 41 and another end in the third direction in contact with the second member 43. With this structure, the resilient member 45 is capable of expanding and contracting in the third direction between a first state and a second state.

When the first holder 34 is compressed in the third direction, the resilient member 45 is compressed in the third direction to generate a resilient force (restoration force). The resilient member 45 urges the second member 43 to move away from the first member 41 (toward the another side) in the third direction due to the resilient force. The first holder 34 is thus capable of expanding and contracting in the third direction by the resilient force of the resilient member 45.

As illustrated in FIG. 1, in the state where the process unit U1 is attached to the main frame 11, the first holder 34 can ensure contact of the first electrical contact surface 33 with the main body electrical contact 15 of the main body 10 by the resilient force of the resilient member 45.

As described above, the protrusion 211 is movable together with the casing 21. Accordingly, the casing 21 and the developing roller 22 can be appropriately fixed in position due to the protrusion 211 receiving a pressing force. Further, the first holder 34 and the first electrical contact surface 33 are movable relative to the casing 21. Hence, the first electrical contact surface 33 can be reliably arranged to make contact with the main body electrical contact 15, irrespective of the positions of the casing 21 and the developing roller 22.

Since the first holder 34 is movable relative to the casing 21, the first electrical contact surface 33 held by the first holder 34 is also movable relative to the casing 21. This configuration can restrain the first electrical contact surface 33 from being rubbed with the main body electrical contact 15 during an attachment process of the developing cartridge 20 to the main body 10.

The first agitator gear 245 includes the large-diameter gear 247, and the small-diameter gear 249. The small-diameter gear 249 is positioned between the casing 21 and the large-diameter gear 247 in the first direction. The protrusion 211 is positioned between the casing 21 and the large-diameter gear 247 in the first direction. The first holder 34 is positioned farther from the protrusion 211 than the large-diameter gear 247 is from the protrusion 211. That is, the first holder 34 is positioned away from the first agitator gear 245 in the first direction. Accordingly, unintentional contact of the first holder 34 with the first agitator gear 245 when the first holder 34 moves relative to the casing 21 can be restrained.

<Drum Cartridge 50>

Figure 9:
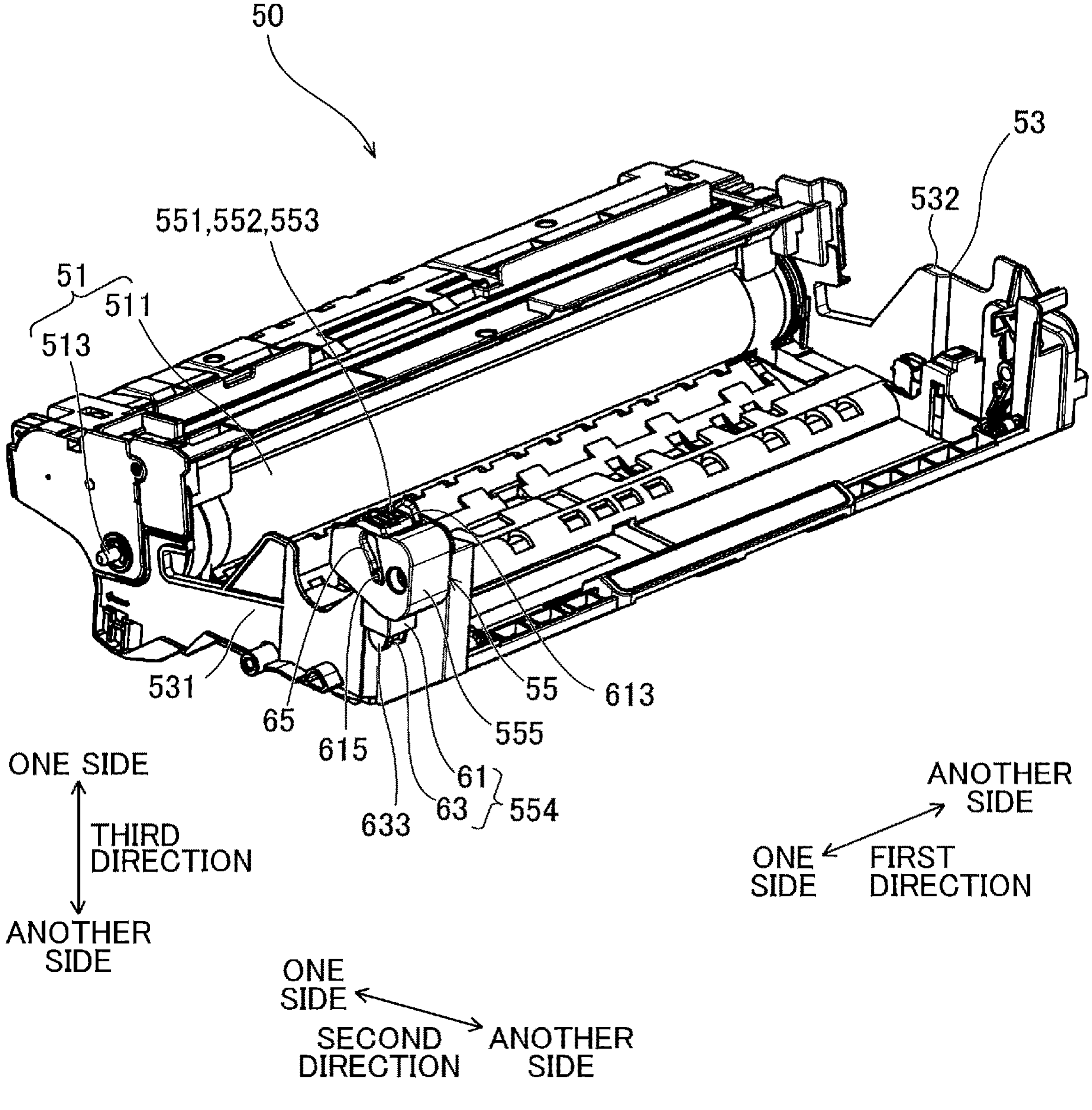
FIG. 9 is a perspective view of a drum cartridge to which the developing cartridge according to the embodiment is attachable.
Figure 10:
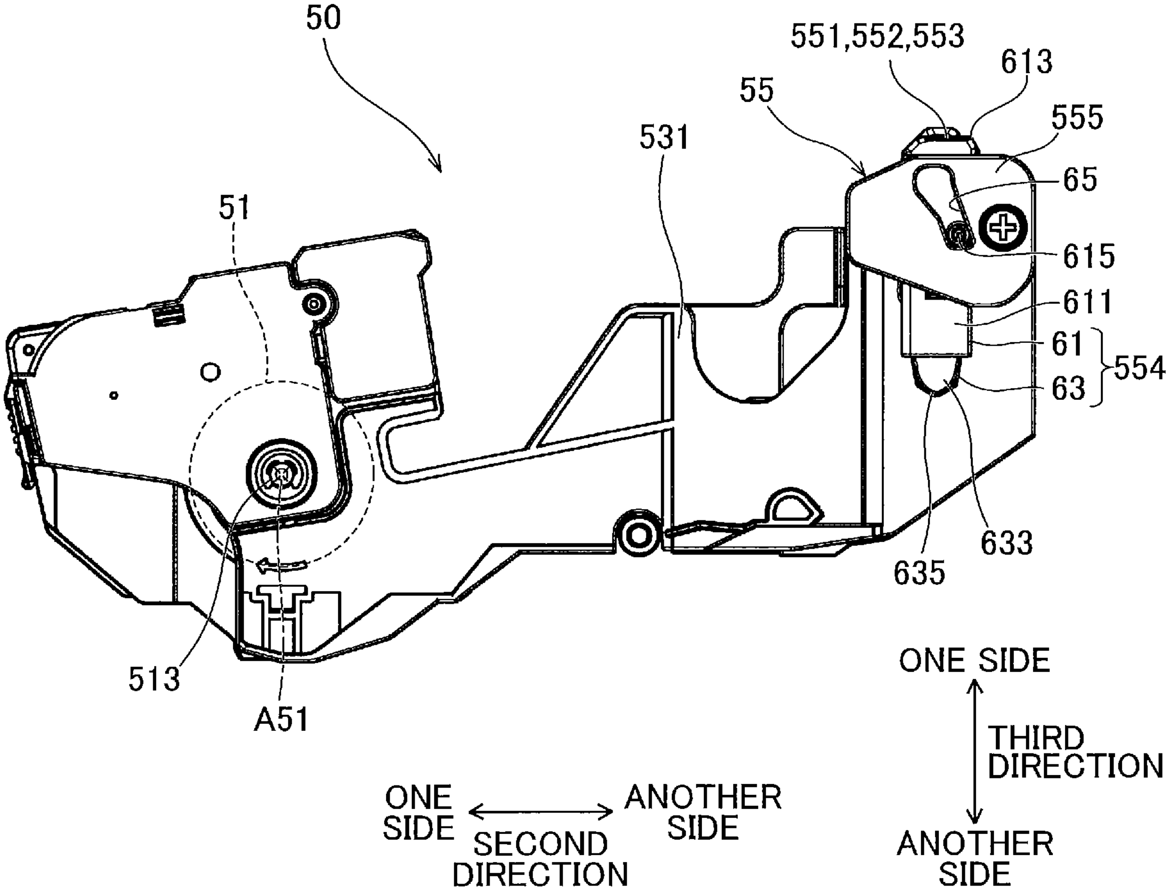
FIG. 10 is a side view of the drum cartridge of FIG. 9.
Figure 11:
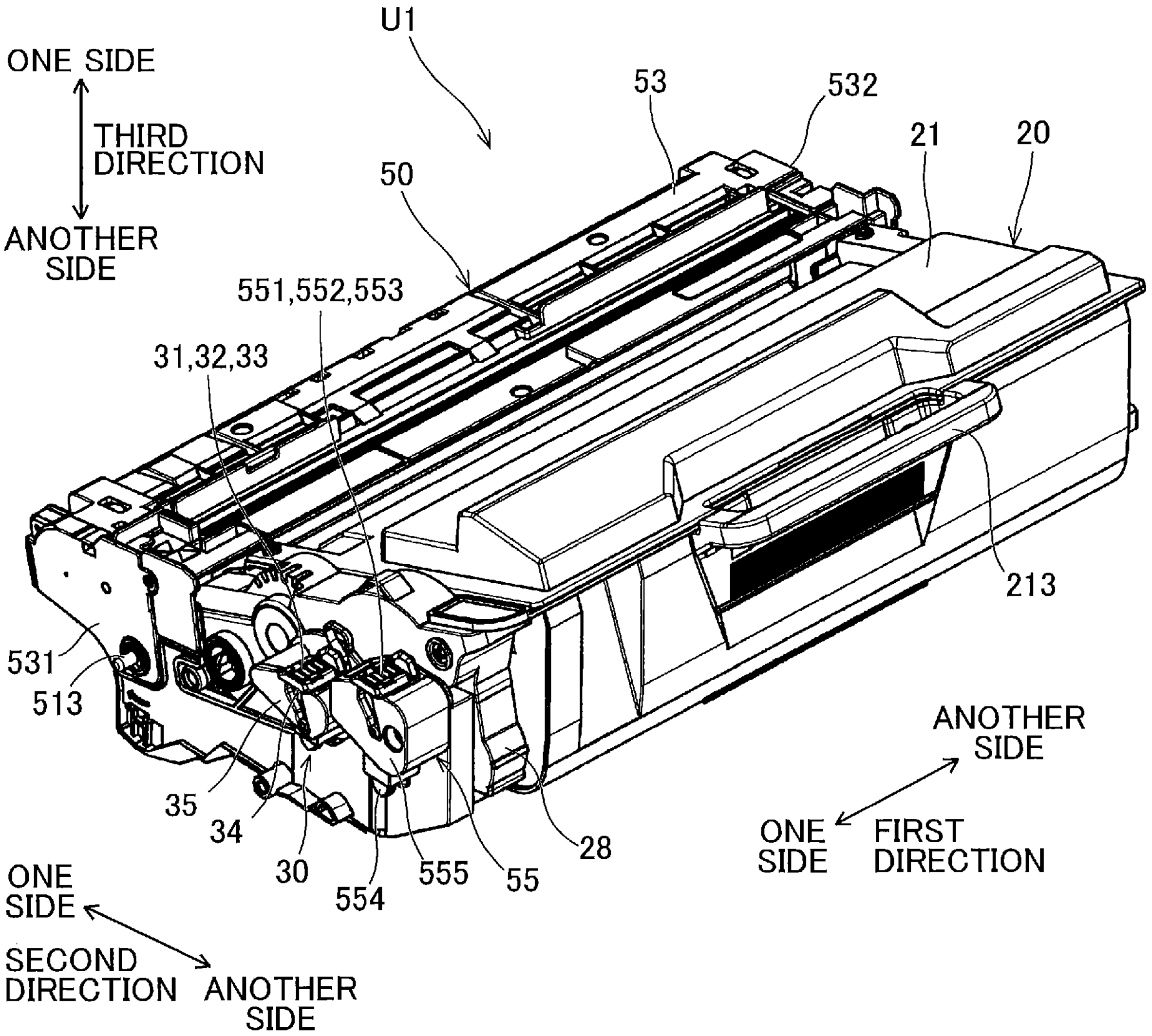
FIG. 11 is a perspective view of the drum cartridge to which the developing cartridge according to the embodiment is attached.
Figure 12:
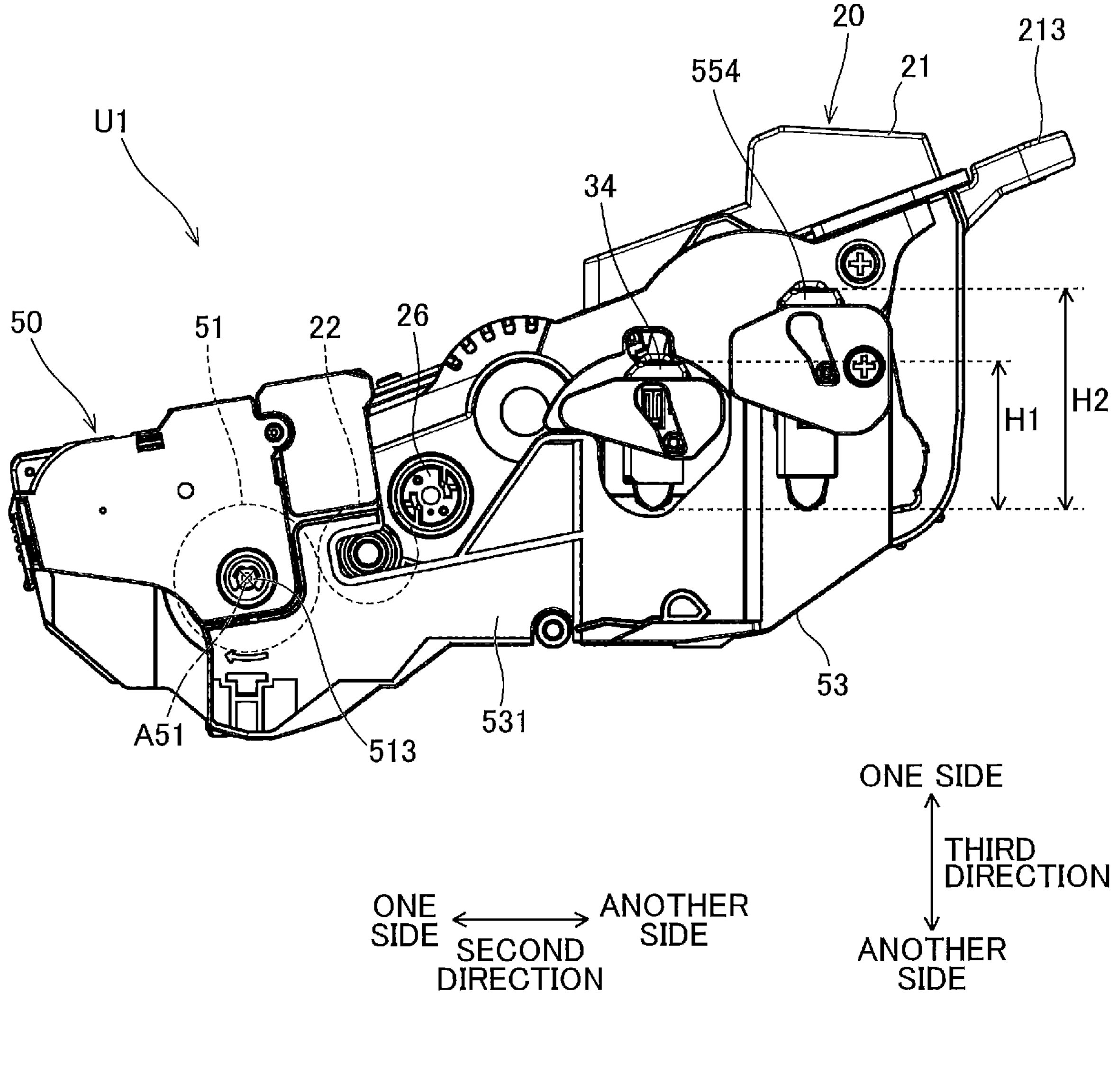
FIG. 12 is a side view of the drum cartridge to which developing cartridge according to the embodiment is attached.

FIG. 9 is a perspective view of the drum cartridge 50. FIG. 10 is a side view of the drum cartridge 50. FIG. 11 is a perspective view of the drum cartridge 50 to which the developing cartridge 20 is attached. FIG. 12 is a side view of the drum cartridge 50 to which the developing cartridge 20 is attached.

The drum cartridge 50 is attachable to the main frame 11 (see FIG. 1). Specifically, the drum cartridge 50 is attachable to the main frame 11 in the state where the developing cartridge 20 is attached to the drum cartridge 50. The drum cartridge 50 includes the photosensitive drum 51, a drum frame 53, and a drum memory unit 55.

As illustrated in FIG. 12, the photosensitive drum 51 is in contact with the developing roller 22 in an attached state of the developing cartridge 20 to the drum cartridge 50. The photosensitive drum 51 is rotatable about a drum axis A51 extending in the first direction. The photosensitive drum 51 includes a drum body 511, and a drum shaft 513. The drum body 511 has a hollow cylindrical shape extending in the first direction. The drum shaft 513 has a solid cylindrical shape extending along the drum axis A51. The drum shaft 513 is made of metal. The drum shaft 513 is positioned radially inward of the drum body 511, that is, inside the drum body 511 to penetrate the drum body 511 in the first direction. Incidentally, the drum shaft 513 may not penetrate the drum body 511 in the first direction. For example, two drum shafts 513 may be attached to respective ends in the first direction of the drum body 511. The photosensitive drum 51 is rotatable about an axis (drum axis A51) of the drum shaft 513.

The drum frame 53 rotatably supports the photosensitive drum 51. The photosensitive drum 51 is positioned closer to one end in the second direction of the drum frame 53 than to another end in the second direction of the drum frame 53. As illustrated in FIG. 9, the drum frame 53 includes a first side plate 531, and a second side plate 532. The first side plate 531 constitutes one end in the first direction of the drum frame 53, and the second side plate 532 constitutes another end in the first direction of the drum frame 53. The photosensitive drum 51 is held by the drum frame 53 at a position between the first side plate 531 and the second side plate 532. Each of the first side plate 531 and the second side plate 532 extends in the second direction.

As illustrated in FIG. 11, the first side plate 531 is positioned outward of the gear cover 28 in the first direction in the attached state of the developing cartridge 20 to the drum cartridge 50. In other words, in the attached state of the developing cartridge 20 to the drum cartridge 50, the first side plate 531 is positioned farther in the first direction from the one end in the first direction of the casing 21 than the gear cover 28 is from the one end of the casing 21. The first side plate 531 covers at least a part of the gear cover 28.

<Drum Memory Unit 55>

The drum memory unit 55 is positioned at one end in the first direction of the drum frame 53. The drum memory unit 55 includes a drum memory 551, a drum substrate 552, the second electrical contact surface 553, a second holder 554 and a second holder cover 555.

The drum memory unit 55 is positioned outside of the drum frame 53. Specifically, the drum memory unit 55 is positioned outward of the first side plate 531 of the drum frame 53 in the first direction. That is, the drum substrate 552, the drum memory 551, the second electrical contact surface 553, the second holder 554, and the second holder cover 555 are positioned outside of the drum frame 53 in the first direction.

<Drum Memory 551>

The drum memory 551 stores therein various information on the drum cartridge 50. For example, the drum memory 551 stores therein ID information and lifetime information. The ID information is identification information used to identify an individual drum cartridge 50, and specifically, is a serial number. The lifetime information includes, for example, the cumulative number of revolutions of the photosensitive drum 51, and the cumulative number of printed sheets using the photosensitive drum 51.

The drum memory 551 is positioned at another end in the third direction of the drum substrate 552. The drum substrate 552 is positioned at one end in the third direction of the second holder 554. The drum substrate 552 is a plate-shaped member.

<Second Electrical Contact Surface 553>

The second electrical contact surface 553 is positioned at one end in the third direction of the drum substrate 552. The second electrical contact surface 553 includes four thin plate-shaped electrodes. The second electrical contact surface 553 is electrically connected to the drum memory 551. As illustrated in FIG. 1, the second electrical contact surface 553 extends in parallel to the second direction crossing the third direction in the state where the drum cartridge 50 is attached to the main frame 11. The second electrical contact surface 553 is movable in the first direction, the second direction, and the third direction relative to the drum frame 53.

<Second Holder 554>

As illustrated in FIG. 9, the second holder 554 is positioned away from one end in the first direction of the drum frame 53. The second holder 554 is movable in the first direction, the second direction, and the third direction relative to the drum frame 53. In the attached state of the developing cartridge 20 to the drum cartridge 50, the second holder 554 is movable in the first direction, the second direction, and the third direction relative to the casing 21 of the developing cartridge 20.

The second holder 554 is capable of expanding and contracting in the third direction. The second holder 554 has a configuration for expansion and contraction the same as that of the first holder 34 for expansion and contraction. Specifically, as illustrated in FIG. 10, the second holder 554 includes a first member 61, and a second member 63. The second member 63 is positioned on the another side of the first member 61 in the third direction. Specifically, the first member 61 includes a sleeve portion 611 constituting another end in the third direction of the first member 61. The sleeve portion 611 has a hollow prismatic columnar shape extending in the third direction. The second member 63 has one end portion in the third direction inserted in the sleeve portion 611.

The second member 63 is movable in the third direction relative to the first member 61. The second member 63 includes a pawl portion (not illustrated). Owing to engagement of the pawl portion with the first member 61, unintentional detachment of the second member 63 from the first member 61 can be prevented. Further, the second holder 554 includes a resilient member (not illustrated). The resilient member is positioned between the first member 61 and the second member 63. The resilient member urges the first member 61 and the second member 63 to be separated from each other in the third direction. Hence, the second holder 554 can expand and contract in the third direction.

The second holder 554 holds the drum substrate 552 to hold the second electrical contact surface 553. A configuration of the second holder 554 for holding the drum substrate 552 is the same as that of the first holder 34 for holding the developing substrate 32. Specifically, as illustrated in FIGS. 9 and 10, the second holder 554 has a first outer surface 613 which constitutes one end in the third direction of the second holder 554. That is, the first outer surface 613 constitutes one end in the third direction of the first member 61. The first outer surface 613 has a recessed shape for receiving the drum substrate 552 therein. The first outer surface 613 can hold the drum memory 551 and the second electrical contact surface 553 by holding the drum substrate 552.

The second holder 554 includes a protruding portion 633 constituting another end in the third direction of the second holder 554. In other words, the protruding portion 633 constitutes another end in the third direction of the second member 63. Specifically, the protruding portion 633 has an outer surface 635. The outer surface 635 constitutes the other end in the third direction of the second member 63. The outer surface 635 has a curved surface.

<Second Holder Cover 555>

The second holder cover 555 is fixed to one end in the first direction of the first side plate 531. Similar to the first holder cover 35, the second holder cover 555 has a hollow prismatic columnar shape to surround the second holder 554 in cooperation with the first side plate 531. The second holder cover 555 holds the second holder 554.

The second holder cover 555 has a configuration for holding the second holder 554 the same as a configuration of the first holder cover 35 for holding the first holder 34. That is, the second holder 554 has a first boss 615 inserted through a through-hole 65 of the second holder cover 555 with room therebetween. The through-hole 65 penetrates the second holder cover 555 in the first direction, and extends diagonally toward the one side in the third direction as extending toward the one side in the second direction. The second holder 554 is movable in the first direction, the second direction, and the third direction relative to the second holder cover 555.

As illustrated in FIGS. 11 and 12, in the process unit U1, the drum memory unit 55 is positioned between the photosensitive drum 51 and the first handle 213 of the developing cartridge 20 in the second direction. In the process unit U1, the drum memory 551, the drum substrate 552, the second electrical contact surface 553, and the second holder 554 are positioned between the photosensitive drum 51 and the first handle 213 in the second direction. In the process unit U1, the second electrical contact surface 553 and the drum memory unit 55 are positioned between the photosensitive drum 51 and another end in the second direction of the casing 21.

In the process unit U1 (that is, in the state where the developing cartridge 20 is attached to the drum frame 53), the first holder 34 is movable in the third direction relative to the drum frame 53.

As illustrated in FIG. 11, in the process unit U1, the casing 21 of the developing cartridge 20 is positioned within the drum frame 53 of the drum cartridge 50. Specifically, in the process unit U1, the casing 21 is positioned between the first side plate 531 and the second side plate 532 in the first direction.

In the process unit U1, the developing memory unit 30 of the developing cartridge 20 is positioned outward of the first side plate 531 of the drum frame 53 in the first direction. That is, the developing substrate 32 and the first holder 34 of the developing memory unit 30 are positioned outside the drum cartridge 50 in the first direction. Specifically, in the process unit U1, the developing substrate 32, the first electrical contact surface 33, and the first holder 34 are positioned farther from the second side plate 532 than from the first side plate 531 in the first direction.

In the process unit U1, the first electrical contact surface 33 is positioned farther in the first direction from the one end in the first direction of the casing 21 than from the one end in the first direction of the drum frame 53. In the process unit U1, the first electrical contact surface 33 is positioned outside the drum frame 53 in the first direction.

In the process unit U1, the developing memory unit 30 is positioned between the developing roller 22 and the drum memory unit 55 in the second direction. That is, the first electrical contact surface 33 is positioned between the developing roller 22 and the second electrical contact surface 553 in the second direction. With this structure, the first electrical contact surface 33 is less likely to hinder attachment of the developing cartridge 20 to the drum cartridge 50.

In the process unit U1, the first electrical contact surface 33 and the second electrical contact surface 553 respectively face the one side in the third direction. In the process unit U1, the first electrical contact surface 33 and the second electrical contact surface 553 are in parallel to the second direction crossing the third direction. In the process unit U1, the first electrical contact surface 33 is positioned between the developing coupling 26 and the second electrical contact surface 553 in the second direction.

In the process unit U1, the casing 21 of the developing cartridge 20 is positioned inside the drum frame 53, and the first electrical contact surface 33 of the developing memory 31 is positioned outside the drum frame 53. With this configuration, a dimension of the process unit U1 in the third direction can be reduced in comparison with a configuration where the first electrical contact surface 33 is positioned inside the drum frame 53. Further, the first electrical contact surface 33 and the drum frame 53 are positioned at the same side (at the one side of the process unit U1) in the first direction. With this configuration, a size of the process unit U1 in the first direction can be made compact.

Further, the first electrical contact surface 33 is positioned between the developing roller 22 and the second electrical contact surface 553 in the second direction. Hence, the developing roller 22 and the first electrical contact surface 33 can be positioned closer to each other in the second direction than otherwise, thereby realizing downsizing of the developing cartridge 20 in the second direction.

In the process unit U1, the first electrical contact surface 33 is positioned between the developing roller 22 and the second electrical contact surface 553 in the third direction. Hence, during an attachment process of the process unit U1 to the main frame 11, the first holder 34 is allowed to move without causing inadvertent contact thereof (and the first electrical contact surface 33 held thereby) with the main body electrical contact 17, as illustrated in FIG. 1.

As illustrated in FIG. 12, in the process unit U1, the first holder 34 has a length H1 in the third direction shorter than a length H2 of the second holder 554.

As illustrated in FIG. 1, in the process unit U1, a first distance LE1 in the second direction between the first holder 34 and the second holder 554 is smaller than a second distance LE2 in the second direction between the developing roller 22 and the first holder 34. That is, in the process unit U1, the first electrical contact surface 33 is positioned closer to the second electrical contact surface 553 than to the developing roller 22 in the second direction.

Accordingly, within the main body 10, the main body electrical contact 15 for contact with the first electrical contact surface 33 is positioned closer to the main body electrical contact 17 for contact with the second electrical contact surface 553 than to the developing roller 22 in the second direction.

<Guide Frame 70>

Figure 13:
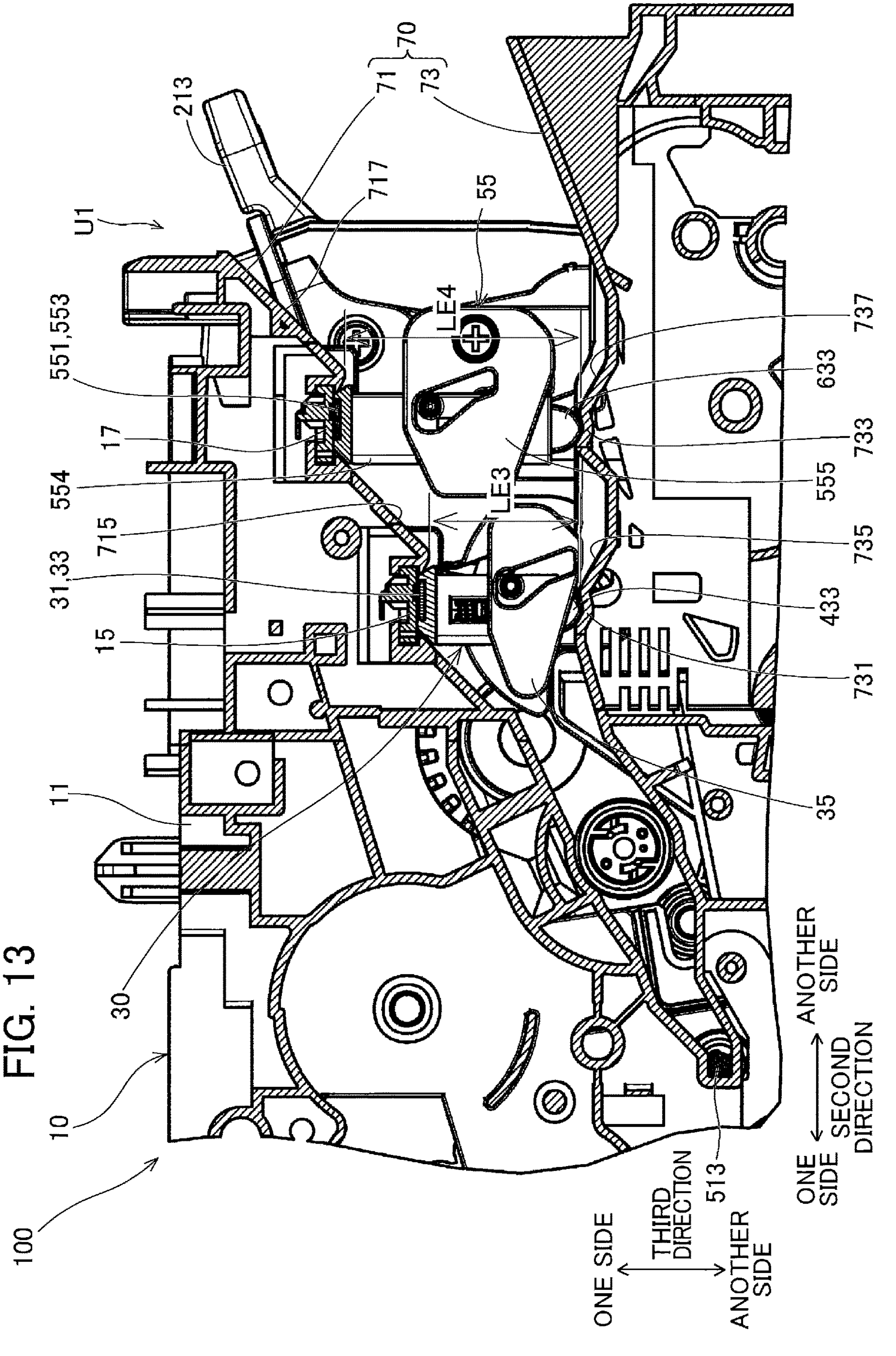
FIG. 13 is a partially-enlarged cross-sectional view of the image forming apparatus incorporating the drum cartridge to which the developing cartridge according to the embodiment is attached.

FIG. 13 is a partial cross-sectional view of the image forming apparatus 100. As illustrated in FIG. 13, the main frame 11 includes the guide frame 70. The guide frame 70 is configured to guide the drum cartridge 50 during the attachment of the process unit U1 to the main frame 11 through the opening 110. The guide frame 70 is configured to guide one end portion in the first direction of the drum cartridge 50. The guide frame 70 is configured to guide the one end portion in the first direction of the drum shaft 513.

<First Guide Frame 71 and Second Guide Frame 73>

As illustrated in FIG. 13, the guide frame 70 includes a first guide frame 71 and a second guide frame 73. The first guide frame 71 and the second guide frame 73 face each other in the third direction. Hence, the third direction may also be defined as a direction in which the first guide frame 71 and the second guide frame 73 face each other (facing direction). The main body electrical contact 15 and the main body electrical contact 17 are positioned at the first guide frame 71.

Figure 14:
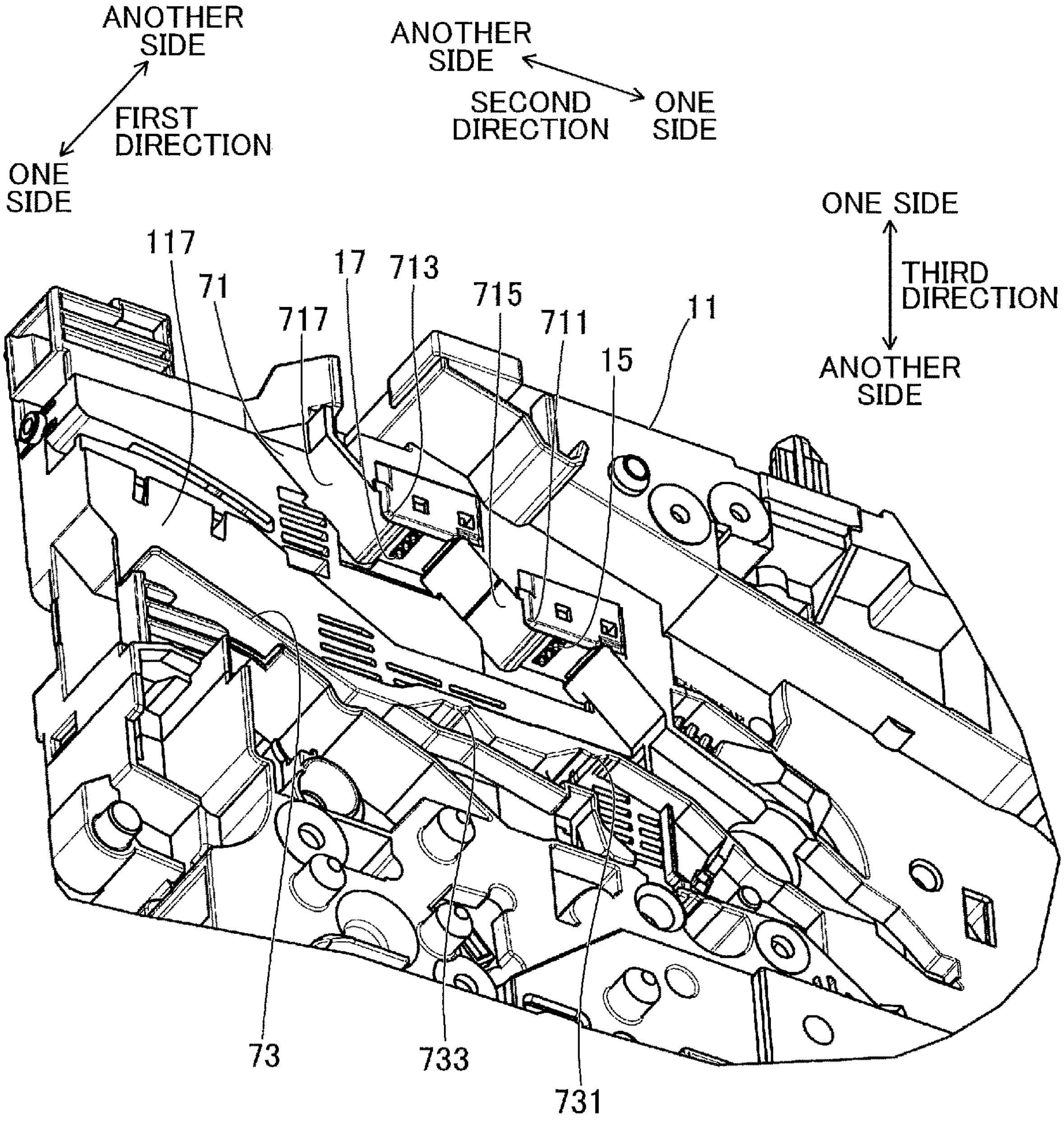
FIG. 14 is a perspective view of a first guide frame of the image forming apparatus.
Figure 15:
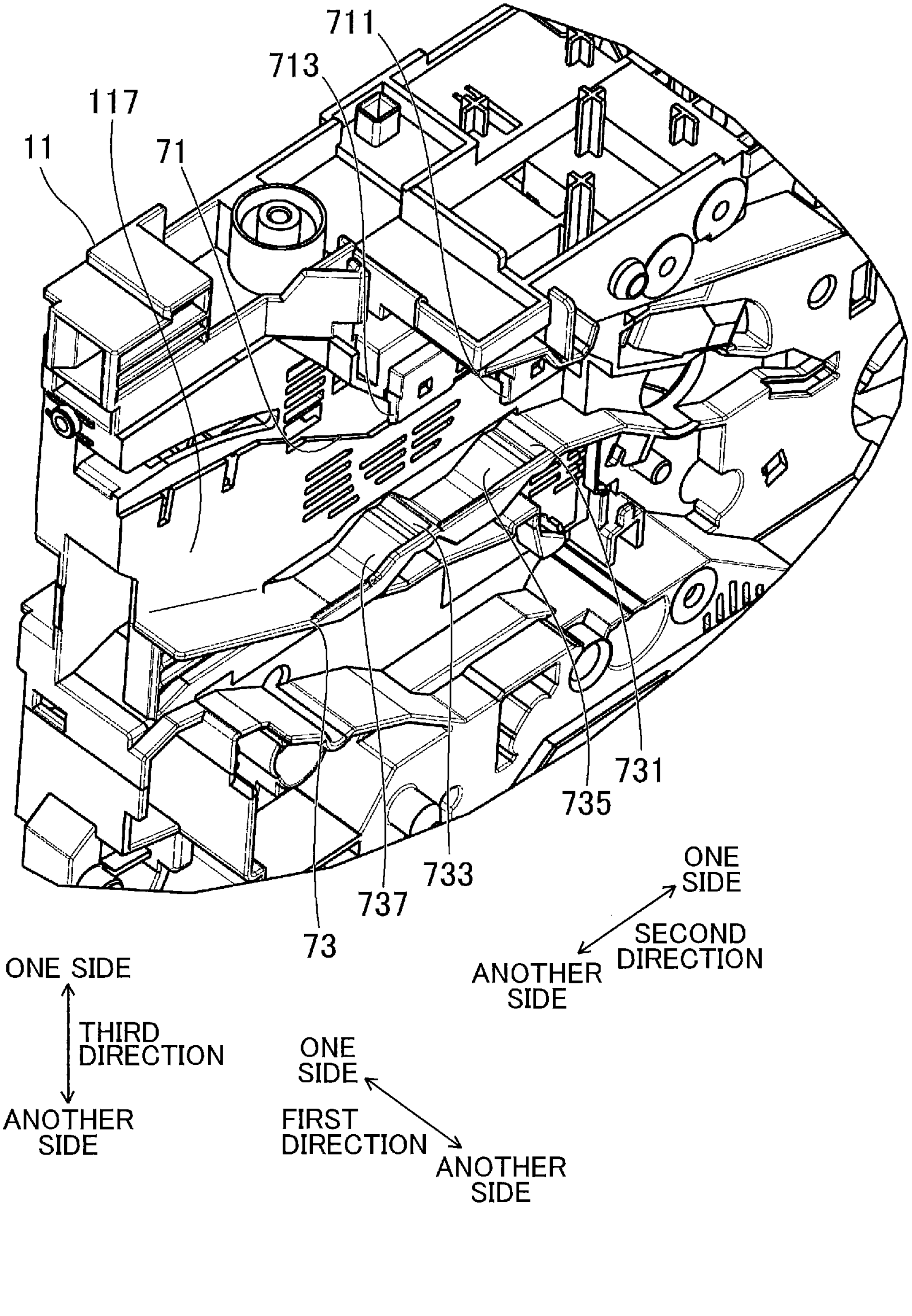
FIG. 15 is a perspective view of a second guide frame of the image forming apparatus.

FIG. 14 is a perspective view of the first guide frame 71. FIG. 14 illustrates an inner portion of one end portion in the first direction of the main frame 11 as viewed from the another side in the third direction. FIG. 15 is a perspective view of the second guide frame 73. FIG. 15 illustrates the inner portion of the one end portion in the first direction of the main frame 11 as viewed from the one side in the third direction.

As illustrated in FIGS. 14 and 15, the first guide frame 71 and the second guide frame 73 are plate-like shape erecting inward in the first direction from an inner surface 117 of the main frame 11, the inner surface 117 crossing the first direction. In other words, the first guide frame 71 and the second guide frame 73 are plate-shape members extending from the inner surface 117 in the first direction. Each of the first guide frame 71 and the second guide frame 73 extends diagonally toward the another side in the third direction as extending toward the one side in the second direction, while bending appropriately at prescribed positions.

As illustrated in FIG. 13, a distance between the first guide frame 71 and the second guide frame 73 in the facing direction (the third direction) is gradually reduced as the first guide frame 71 and the second guide frame 73 extend toward the main body electrical contact 15 from the opening 110 in the second direction.

In the guide frame 70, the distance between the first guide frame 71 and the second guide frame 73 in the facing direction (the third direction) is made larger at the near side (near the opening 110), and smaller at the far side (near the main body electrical contact 15) in the attachment direction of the process unit U1 to the main body 10 (the second direction). This configuration of the guide frame 70 can provide gradual positioning of the process unit U1 during the attachment process of the process unit U1 to the main body 10. Further, this gradual reduction in the distance between the first guide frame 71 and the second guide frame 73 in the third direction toward the main body electrical contact 15 in the second direction can avoid inadvertent contact of the first electrical contact surface 33 (at the leading side in the process unit U1) with the main body electrical contact 17 (closer to the opening 110) during the attachment process of the process unit U1 to the main frame 11.

Further, the first holder 34 is movable in the third direction relative to the casing 21, and the second holder 554 is movable in the third direction relative to the drum frame 53. This structure can reduce frictional contact of the first electrical contact surface 33 held by the first holder 34 and the second electrical contact surface 553 held by the second holder 554 with a portion of the main frame 11 during the attachment process of the process unit U1 to the main frame 11.

<Groove 731>

As illustrated in FIGS. 13 through 15, the second guide frame 73 has a groove 731 for receiving the protruding portions 433 and 434 of the first holder 34 of the attached process unit U1. That is, the groove 731 is configured to guide the other end in the third direction of the first holder 34 in the attached state of the process unit U1 to the main frame 11.

<Groove 733>

As illustrated in FIGS. 13 through 15, the second guide frame 73 has a groove 733 configured to receive the protruding portion 633 of the second holder 554 of the attached process unit U1. That is, the groove 733 is configured to guide the other end in the third direction of the second holder 554 in the attached state of the process unit U1 to the main frame 11.

The main body electrical contact 15 crosses the third direction. Specifically, the main body electrical contact 15 includes four contacts each configured to contact corresponding one of the four electrodes of the first electrical contact surface 33. The four contacts are positioned on a single plane extending in parallel to the second direction crossing the third direction. Similar to the main body electrical contact 15, the main body electrical contact 17 crosses the third direction.

During the attachment process of the process unit U1 to the main frame 11, the first holder 34 and the second holder 554 are inserted into the guide frame 70 between the first guide frame 71 and the second guide frame 73 toward the one side in the second direction.

As illustrated in FIG. 13, the main frame 11 holds the first holder 34 at a position between the main body electrical contact 15 and the second guide frame 73 in the third direction in the state where the process unit U1 is attached to the main frame 11. Further, as illustrated in FIG. 13, the main frame 11 holds the second holder 554 at a position between the main body electrical contact 17 and the second guide frame 73 in the third direction in the state where the process unit U1 is attached to the main frame 11. In other words, the second holder 554 is retained between the main body electrical contact 17 and the second guide frame 73 in the attached state of the process unit U1 to the main frame 11.

As illustrated in FIGS. 14 and 15, the first guide frame 71 includes projecting portions 711 and 713. Each of the projecting portions 711 and 713 has a plate-like shape extending in the second direction and protruding toward the another side in the third direction. As illustrated in FIG. 14, the projecting portion 711 is positioned inward (at the another side) of the main body electrical contact 15 in the first direction, and the projecting portion 713 is positioned inward (at the another side) of the main body electrical contact 17 in the first direction.

Upon insertion of the process unit U1 into the main frame 11 in the second direction, the projecting portion 711 is fitted into the holder groove 414 (see FIG. 7) of the first holder 34. Hence, the first holder 34 moves in the second direction while being guided by the projecting portion 711. The second holder 554 also has a similar holder groove at one end in the third direction thereof. Hence, in accordance with the insertion of the process unit U1 into the main frame 11 in the second direction, the projecting portion 713 is fitted with the holder groove of the second holder 554. The second holder 554 thus moves in the second direction while being guided by the projecting portion 713.

As illustrated in FIGS. 13 through 15, the first guide frame 71 has sloped surfaces 715 and 717. The sloped surface 715 is positioned between the main body electrical contact 15 and the main body electrical contact 17 in the second direction. The sloped surface 717 is positioned at the another side (the side closer to the opening 110) of the main body electrical contact 17 in the second direction. The sloped surfaces 715 and 717 are inclined toward the second guide frame 73 as extending toward the one side in the second direction. In other words, the sloped surfaces 715 and 717 are inclined to approach the second guide frame 73 as extending farther from the opening 110 in the second direction.

As illustrated in FIGS. 13 and 15, the second guide frame 73 has sloped surfaces 735 and 737. The sloped surface 735 is positioned at the another side (the side closer to the opening 110) of the groove 731 in the second direction. The sloped surface 735 is connected to the groove 731. The sloped surface 737 is positioned at the another side (the side closer to the opening 110) of the groove 733 in the second direction. The sloped surface 737 is connected to the groove 733. The sloped surfaces 735 and 737 are inclined toward the first guide frame 71 as extending toward the one side in the second direction. In other words, the sloped surfaces 735 and 737 are inclined to approach the first guide frame 71 as extending farther from the opening 110 in the second direction.

As illustrated in FIG. 13, with respect to a range from the main body electrical contact 15 to the main body electrical contact 17 in the second direction, the distance between the first guide frame 71 and the second guide frame 73 in the third direction is reduced to a third distance LE3 as advancing toward the one side in the second direction. Specifically, the third distance LE3 is an interval in the third direction between one end in the second direction of the sloped surface 715 and one end in the second direction of the sloped surface 735. The groove 731 facing the main body electrical contact 15 in the third direction is recessed toward the another side in the third direction. Therefore, an interval between the main body electrical contact 15 and the second guide frame 73 (at the groove 731) in the third direction is greater than the third distance LE3. Therefore, during the insertion of the process unit U1 into the main frame 11, the first holder 34 is temporarily compressed into a length equal to the third distance LE3 in the third direction, and then, finally expands in the third direction so that the first electrical contact surface 33 comes in contact with the main body electrical contact 15. Hence, the first holder 34 fitted with the groove 731 is less likely to be removed therefrom, thereby being stably retained in the guide frame 70. Further, frictional contact of the first electrical contact surface 33 with the main body electrical contact 15 can be restrained.

As illustrated in FIG. 13, with respect to a range from the main body electrical contact 17 toward the another side in the second direction, the distance between the first guide frame 71 and the second guide frame 73 in the third direction is reduced to a fourth distance LE4 as advancing toward the one side in the second direction. Specifically, the fourth distance LE4 is an interval in the third direction between one end in the second direction of the sloped surface 717 and one end in the second direction of the sloped surface 737. The groove 733 facing the main body electrical contact 17 in the third direction is recessed toward the another side in the third direction. Therefore, an interval between the main body electrical contact 17 and the second guide frame 73 (at the groove 733) in the third direction is greater than the fourth distance LE4. Therefore, during the insertion of the process unit U1 into the main frame 11, the second holder 554 is temporarily compressed into a length equal to the fourth distance LE4 in the third direction, and then, finally expands in the third direction so that the second electrical contact surface 553 comes in contacts the main body electrical contact 17. Hence, the second holder 554 fitted with the groove 733 is less likely to be removed therefrom, thereby being stably retained in the guide frame 70. Further, frictional contact of the second electrical contact surface 553 with the main body electrical contact 17 can be restrained.

The third distance LE3 is shorter than the fourth distance LE4. Hence, the first holder 34 is allowed to move through a gap in the third direction between the main body electrical contact 17 and the second guide frame 73 during the attachment of the process unit U1 to the main frame 11.

The length H1 of the first holder 34 in the third direction is smaller than the length H2 of the second holder 554 prior to attachment of the process unit U1 to the main frame 11, as illustrated in FIG. 12. Hence, the first holder 34 is allowed to move in the second direction without making interference with the main body electrical contact 17 during the attachment of the process unit U1 to the main frame 11.

The first electrical contact surface 33 and the second electrical contact surface 553 are positioned at the same side in the first direction, since the first holder 34 and the second holder 554 are positioned at the same side in the first direction. Therefore, in the main body 10 of the image forming apparatus 100, the main body electrical contact 15 (with which the first electrical contact surface 33 is to be contacted) and the main body electrical contact 17 (with which the second electrical contact surface 553 is to be contacted) are positioned at the same side in the first direction. Hence, resultant main body 10 can be made compact. Further, electrical wiring for connecting the main body electrical contact 15 and the main body electrical contact 17 to the main body substrate 13 can also be arranged at the same side (one side) in the first direction. The main body 10 can be further made compact.

In the process unit U1, the first holder 34 is positioned between the developing roller 22 and the second holder 554 in the second direction. With this structure, the developing cartridge 20 can be made compact in the second direction. Further, the process unit U1 can also be made compact, in comparison with a configuration where the first holder 34 is positioned farther from the developing roller 22 than the second holder 554 is from the developing roller 22 in the second direction.

<Attachment of Process Unit U1>

Figure 16A:
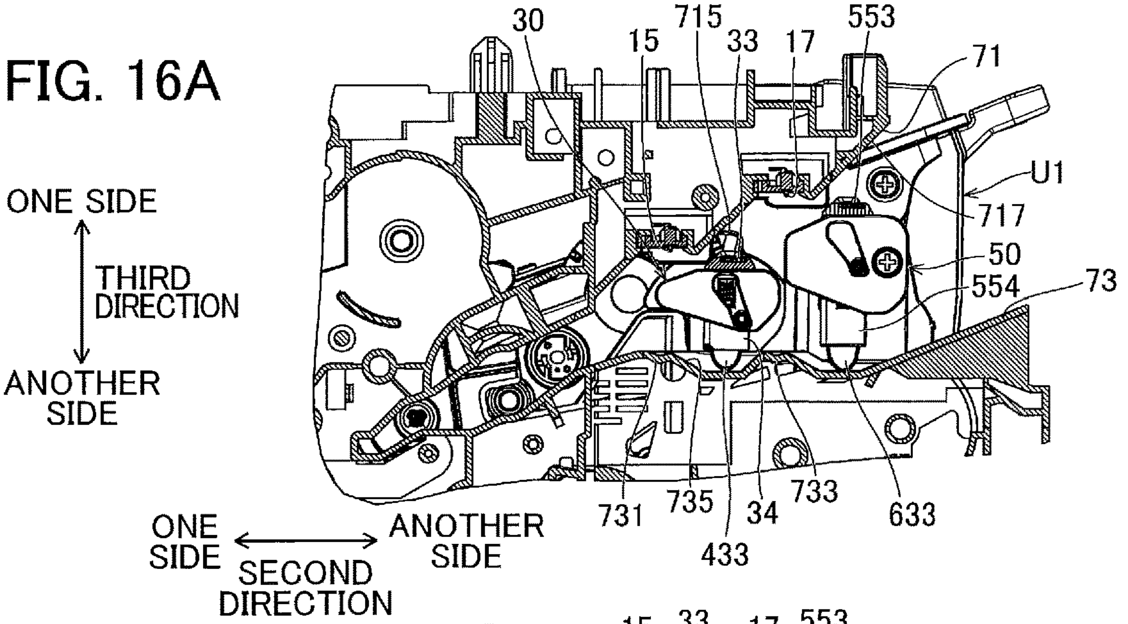
FIGS. 16A to 16C are views illustrating an attachment process of a process unit (the drum cartridge to which the developing cartridge according to the embodiment is attached) to a main frame of the image forming apparatus.
Figure 16B:
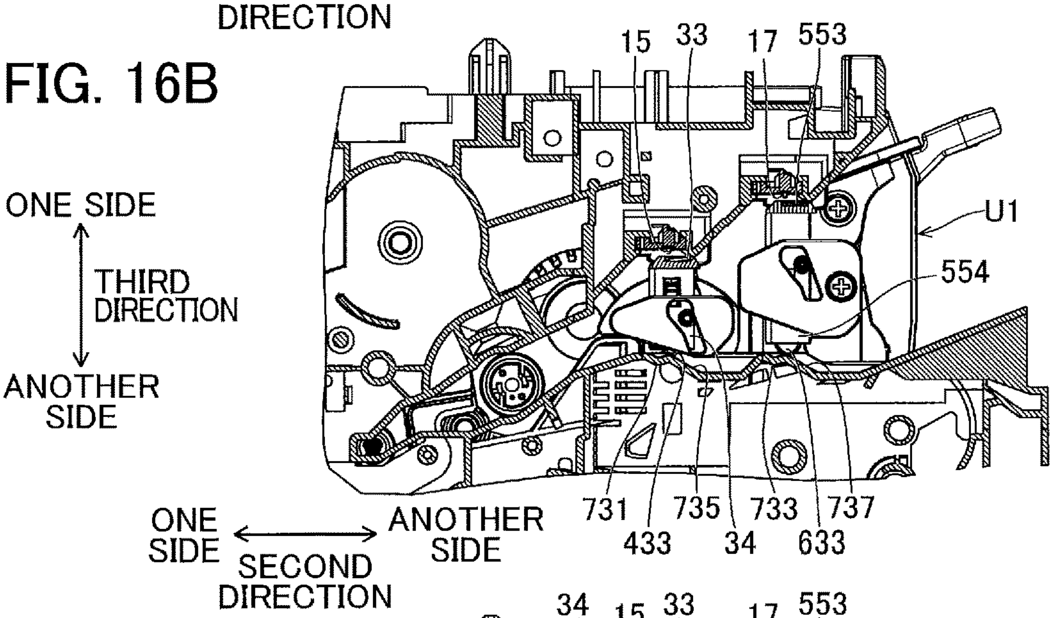
Figure 16C:
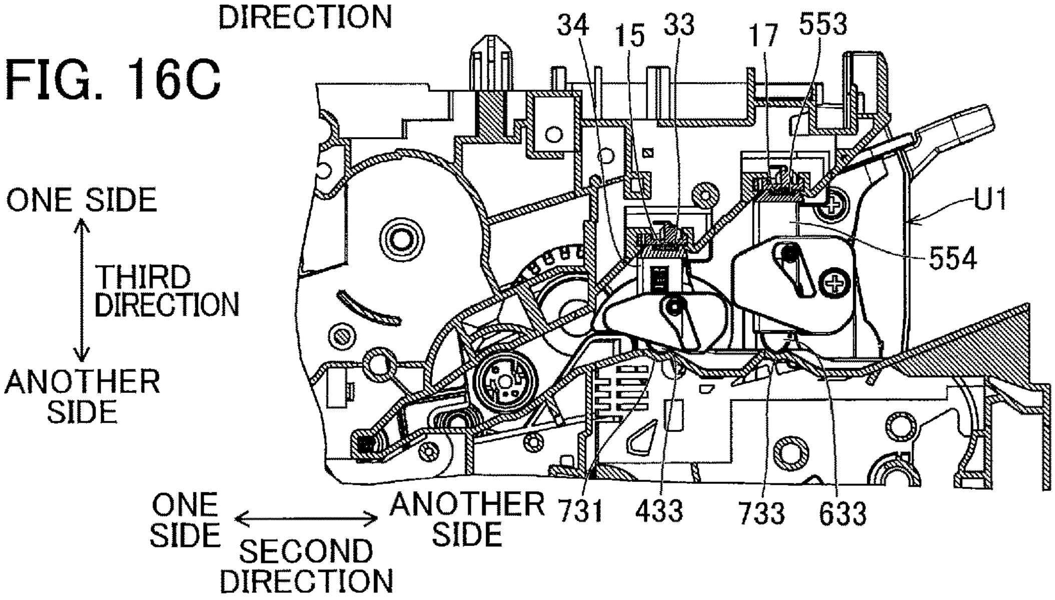

FIG. 16A through 16C are side views illustrating phases during the attachment of the process unit U1 to the main frame 11. FIG. 16A and FIG. 16B illustrate the process unit U1 prior to attachment to the main frame 11. FIG. 16C illustrates the process unit U1 attached to the main frame 11.

As illustrated in FIG. 16A, as the process unit U1 is inserted into the main frame 11, the other end in the third direction of the first holder 34 and the other end in the third direction of the second holder 554 respectively contact the second guide frame 73 of the guide frame 70. In the phase illustrated in FIG. 16A, each of the first holder 34 and the second holder 554 is in a most expanding state thereof in the third direction. As the process unit U1 is inserted further in the second direction, the one end in the third direction of the first holder 34 and the one end in the third direction of the second holder 554 are brought into contact with the first guide frame 71.

As the process unit U1 is inserted further toward the one side in the second direction from the phase illustrated in FIG. 16A, the first holder 34 is brought into contact with the sloped surface 715 of the first guide frame 71 and the sloped surface 735 of the second guide frame 73; and the second holder 554 is brought into contact with the sloped surface 717 of the first guide frame 71 and the sloped surface 737 of the second guide frame 73. In this way, the first holder 34 and the second holder 554 move toward the one side in the second direction while being compressed in the third direction. Then as illustrated in FIG. 16B, the protruding portion 433 of the first holder 34 reaches the other end in the second direction of the groove 731, and at the same time, the protruding portion 633 of the second holder 554 reaches the other end in the second direction of the groove 733. At this time, each of the first holder 34 and the second holder 554 is in a most compressed state thereof in the third direction.

As the process unit U1 is further inserted toward the one side in the second direction from the phase illustrated in FIG. 16B, the protruding portion 433 and the protruding portion 633 are then fitted with the groove 731 and the groove 733, respectively, as illustrated in FIG. 16C, after moving past the sloped surface 735 and the sloped surface 737 of the second guide frame 73. At this time, each of the first holder 34 and the second holder 554 expands in the third direction from its most compressed state (see FIG. 16B) by a length equal to a depth of the corresponding groove 731, 733. The first holder 34 and the second holder 554 are thus fixed at respective predetermined positions by the guide frame 70. The first electrical contact surface 33 is electrically connected to the main body electrical contact 15, and the second electrical contact surface 553 is electrically connected to the main body electrical contact 17.

<Detachment of Process Unit U1>

Figure 17A:
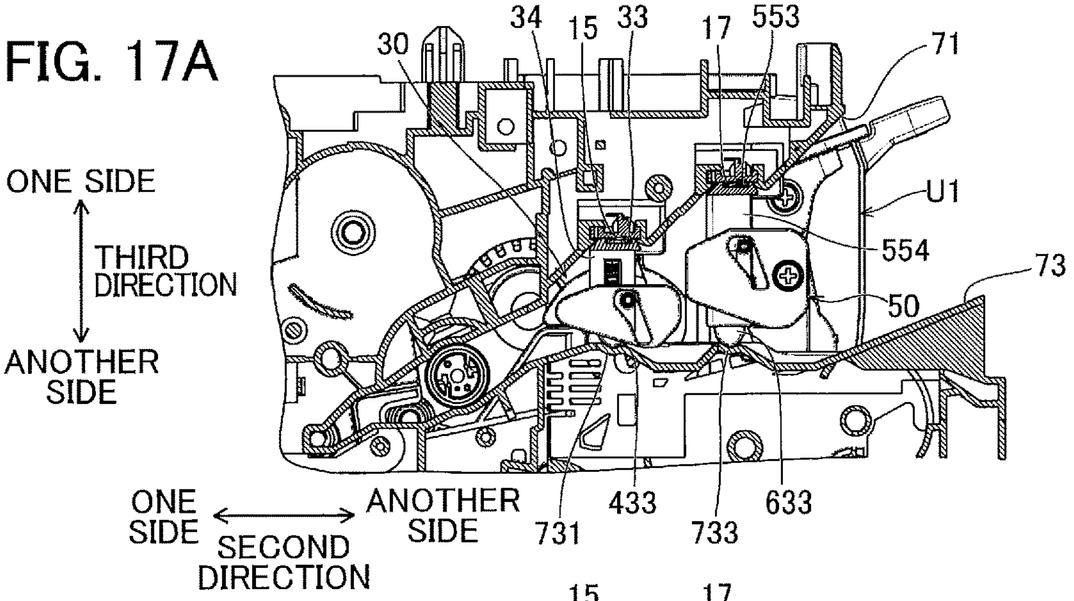
FIGS. 17A to 17C are views illustrating a detachment process of the process unit from the main casing of the image forming apparatus.
Figure 17B:
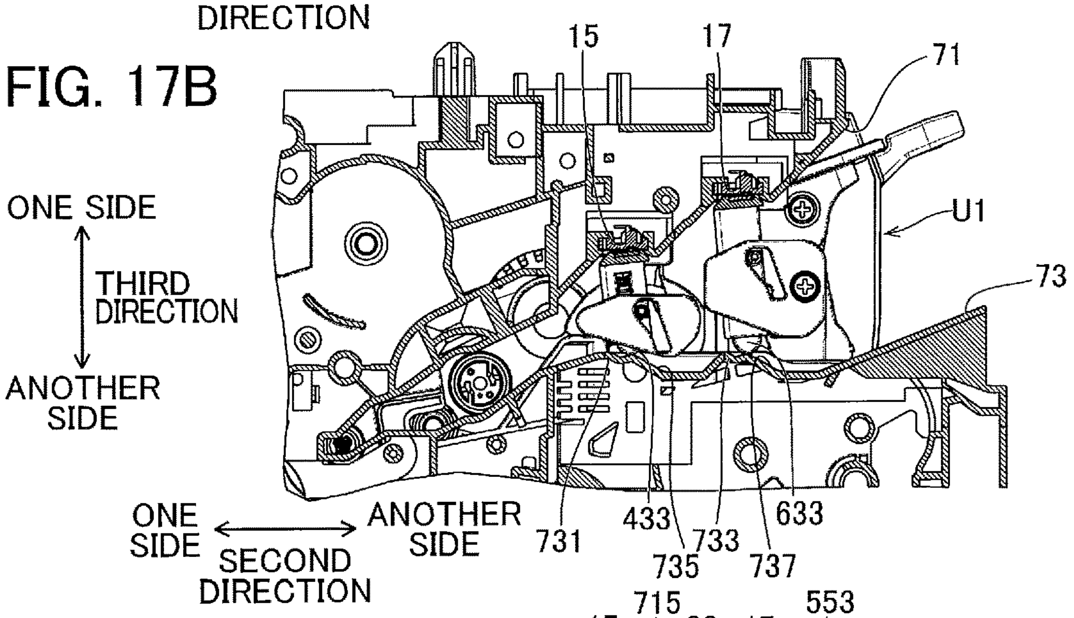
Figure 17C:
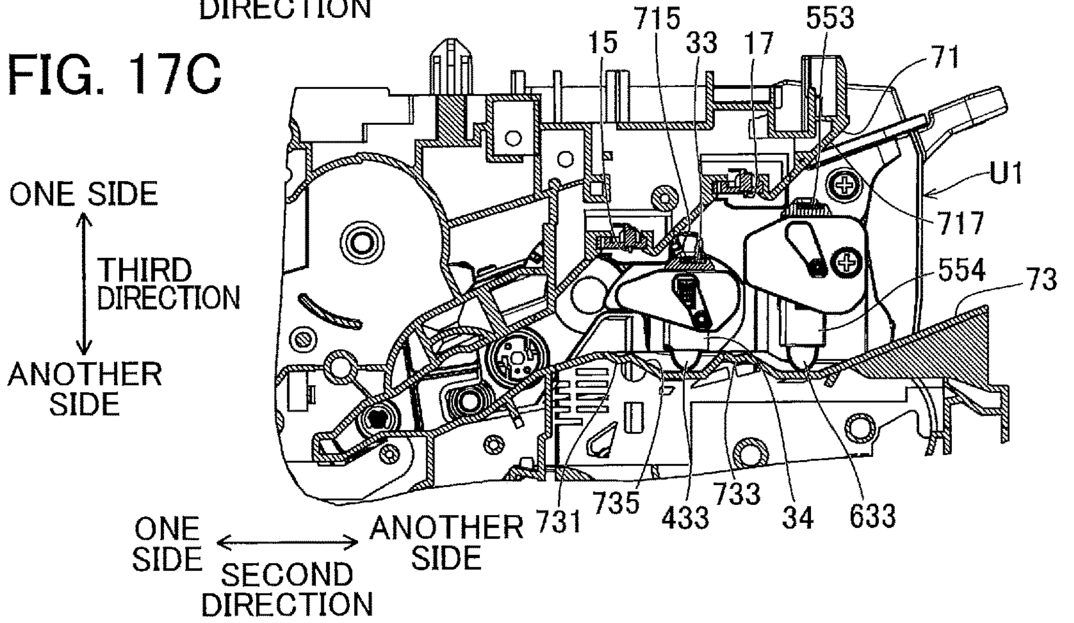

FIGS. 17A to 17C are side views illustrating phases during detachment of the process unit U1 from the main frame 11. FIG. 17A illustrates the process unit U1 attached to the main frame 11. FIGS. 17B and 17C illustrate the process unit U1 detached from the main frame 11.

As the process unit U1 is moved toward the another side in the second direction from the phase illustrated in FIG. 17A, the protruding portion 433 of the first holder 34 and the protruding portion 633 of the second holder 554 move past the groove 731 and the groove 733 of the second guide frame 73, respectively, and move onto the sloped surface 735, and the sloped surface 737, respectively as illustrated in FIG. 17B. Hence, the first holder 34 and the second holder 554 are unfixed from the guide frame 70. Further, the first electrical contact surface 33 and the second electrical contact surface 553 are electrically disconnected from the main body electrical contact 15 and the main body electrical contact 17, respectively.

As the process unit U1 is moved further toward the another side in the second direction from the phase illustrated in FIG. 17B, the first holder 34 and the second holder 554 are respectively separated from the first guide frame 71, as illustrated in FIG. 17C. Accordingly, the first holder 34 and the second holder 554 are respectively in their most expanding states in the third direction.

<Variations and Modifications>

Incidentally, the developing roller 22 is not a requisite member in the developing cartridge 20. For example, the developing roller 22 may be provided in the drum cartridge 50, not in the developing cartridge 20.

In the process unit U1 of the embodiment, the first electrical contact surface 33 is positioned between the developing roller 22 and the second electrical contact surface 553 in the second direction. Alternatively, in the process unit U1, the first electrical contact surface 33 may be positioned at the another side of the second electrical contact surface 553 in the second direction. In other words, the second electrical contact surface 553 may be positioned between the developing roller 22 and the first electrical contact surface 33 in the second direction. In the latter case, in the attached state of the process unit U1 to the main frame 11, the main body electrical contact 15 may be configured to be electrically connected to the second electrical contact surface 553, and the main body electrical contact 17 may be configured to be electrically connected to the first electrical contact surface 33.

While the description has been made in detail with reference to the embodiment, the embodiment described above is merely an example and the present disclosure is not limited thereto. Various modifications not described herein may be made without departing from the scope of the disclosure. Components in the embodiment and modifications may be suitably combined or omitted as long as the combination or omission does not lead to conflicting problems.

[Remarks]

The developing cartridge 20 is an example of a developing cartridge. The casing 21 is an example of a casing. The developing roller 22 is an example of a developing roller. The first agitator 24 is an example of a first agitator. The first agitator gear 245 is an example of an agitator gear. The large-diameter gear 247 and small-diameter gear 249 are examples of a large-diameter gear and a small-diameter gear, respectively. The protrusion 211 is an example of a first protrusion. The developing memory 31 is an example of a developing memory. The first electrical contact surface 33 is an example of a first electrical contact surface. The first holder 34 is an example of a first holder. The first holder cover 35 is an example of a first holder cover. The gear cover 28 is an example of a gear cover. The through-hole 354 is an example of a first through-hole. The first boss 411 is an example of a first boss. The first outer surface 215 is an example of a first outer surface of the casing in the third direction. The second outer surface 216 is an example of a second outer surface of the casing in the third direction. The through-hole 355 is an example of a second through-hole. The second boss 412 is an example of a second boss. The first outer surface 413 is an example of a first outer surface of the first holder in the third direction. The second outer surface 435 is an example of a second outer surface of the first holder in the third direction. The holder groove 414 is an example of a first holder groove. The holder protrusion 415 is an example of a holder protrusion. The resilient member 45 is an example of a resilient member. The curved surfaces 436 and 437 are examples of the first and second curved surfaces, respectively. The first handle 213 is an example of a first handle.

What is claimed is:

1. A developing cartridge comprising:

a developing roller rotatable about a developing roller axis extending in a first direction;

a casing configured to accommodate developer therein;

a coupling rotatable about a coupling axis extending in the first direction, the coupling being positioned at one end of the casing in the first direction, the coupling including a coupling gear;

an idle gear being positioned at the one end of the casing, the idle gear including:

a first idle gear rotatable about an idle axis extending in the first direction, the first idle gear meshing with the coupling gear, and a second idle gear rotatable about the idle axis together with the first idle gear, a diameter of the second idle gear being smaller than a diameter of the first idle gear, the first idle gear being positioned between the second idle gear and the one end of the casing in the first direction;

an agitator rotatable about an agitator axis extending in the first direction;

an agitator gear rotatable about the agitator axis together with the agitator, the agitator gear being positioned at the one end of the casing, the agitator gear meshing with the second idle gear;

a developing memory including an electrical contact surface; and a holder holding the electrical contact surface, the holder being positioned at the one end of the casing, the holder being positioned farther from the one end of the casing than the agitator gear is from the one end of the casing in the first direction, wherein at least a part of the holder is positioned within an area defined by a diameter of the agitator gear in a second direction.

2. The developing cartridge according to claim 1, wherein the developing roller is positioned at one end of the casing in the second direction.

3. The developing cartridge according to claim 2, further comprising a handle positioned at another end in the second direction of the casing, wherein the holder is positioned between the developing roller and the handle in the second direction.

4. The developing cartridge according to claim 1, further comprising a gear cover covering at least a part of the agitator gear, wherein the gear cover is positioned between the holder and the one end of the casing in the first direction.

5. The developing cartridge according to claim 4, wherein the holder is movable relative to the gear cover.

6. The developing cartridge according to claim 5, further comprising a holder cover holding the holder and attached to the gear cover in the first direction, wherein the holder is movable relative to the gear cover and the holder cover.

7. The developing cartridge according to claim 6, wherein the holder cover is fixed to the gear cover in the first direction.

8. The developing cartridge according to claim 7, wherein the holder cover is fixed to the gear cover by a screw.

9. The developing cartridge according to claim 8, wherein the holder cover is fixed to an outer surface of the gear cover by the screw inserted from an inner surface of the gear cover.

10. The developing cartridge according to claim 1, wherein the holder is movable in the first direction relative to the developing roller.

11. The developing cartridge according to claim 1, wherein the holder is movable in the second direction relative to the developing roller.

12. The developing cartridge according to claim 1, wherein the second direction is perpendicular to the first direction.

13. The developing cartridge according to claim 1, wherein the holder has a first outer surface positioned at one end portion of the holder in a third direction crossing the electrical contact surface, the first outer surface holding the electrical contact surface.

14. The developing cartridge according to claim 13, wherein the holder has a holder groove positioned at the one end portion in the third direction.

15. The developing cartridge according to claim 1, wherein the agitator gear includes:

a large diameter gear; and a small diameter gear having a diameter smaller than a diameter of the large diameter gear.

16. The developing cartridge according to claim 15, wherein the small diameter gear is positioned between the large diameter gear and the one end of the casing in the first direction.

17. The developing cartridge according to claim 15, further comprising a protrusion protruding outward in the first direction from the one end of the casing, the protrusion being positioned between the casing and the large diameter gear in the first direction, the protrusion being positioned away from the small diameter gear in the second direction, the protrusion being movable together with the casing.

18. The developing cartridge according to claim 17, wherein the protrusion is positioned between the holder and the one end of the casing in the first direction.

19. The developing cartridge according to claim 1, wherein the idle axis is positioned between the developing roller and the holder in the second direction.

20. The developing cartridge according to claim 1, wherein the holder is movable relative to the casing.

* * * * *